US009325150B2

(12) United States Patent
Moriya et al.

(10) Patent No.: US 9,325,150 B2
(45) Date of Patent: Apr. 26, 2016

(54) ALIGNMENT SYSTEM AND EXTREME ULTRAVIOLET LIGHT GENERATION SYSTEM

(75) Inventors: Masato Moriya, Oyama (JP); Osamu Wakabayashi, Hiratsuka (JP)

(73) Assignee: GIGAPHOTON INC, Tochigi (JP)

( * ) Notice: Subject to any disclaimer, the term of this patent is extended or adjusted under 35 U.S.C. 154(b) by 80 days.

(21) Appl. No.: 14/238,405

(22) PCT Filed: Sep. 5, 2012

(86) PCT No.: PCT/IB2012/001713
§ 371 (c)(1),
(2), (4) Date: Feb. 11, 2014

(87) PCT Pub. No.: WO2013/054163
PCT Pub. Date: Apr. 18, 2013

(65) Prior Publication Data
US 2014/0191108 A1 Jul. 10, 2014

(30) Foreign Application Priority Data

Oct. 11, 2011 (JP) .................. 2011-224213

(51) Int. Cl.
 H05G 2/00 (2006.01)
 H01S 3/101 (2006.01)
 H01S 3/23 (2006.01)
 H01S 3/00 (2006.01)
(52) U.S. Cl.
 CPC ................ *H01S 3/101* (2013.01); *H05G 2/008* (2013.01); *H01S 3/005* (2013.01); *H01S 3/0078* (2013.01); *H01S 3/2391* (2013.01)

(58) Field of Classification Search
 CPC ............ H05G 2/00; H05G 2/008; H01S 3/00; H01S 3/101
 See application file for complete search history.

(56) References Cited

U.S. PATENT DOCUMENTS

2010/0117009 A1  5/2010  Moriya et al.
2010/0127191 A1  5/2010  Partlo et al.

OTHER PUBLICATIONS

International Search Report issued in International Application No. PCT/IB2012/001713 issued on Jan. 4, 2013.
International Preliminary Report on Patentability PCT/IB2012/001713 dated Apr. 15, 2014.
(Continued)

*Primary Examiner* — Renee D Chavez
(74) *Attorney, Agent, or Firm* — Studebaker & Brackett PC

(57) ABSTRACT

An alignment system for a laser apparatus includes a guide laser device outputting a guide laser beam, an adjusting mechanism adjusting travel directions of the guide laser beam and a laser beam from the laser apparatus, a beam path combiner controlling travel directions of the laser beam and the guide laser beam to substantially coincide with each other, a first optical detection unit provided from the beam path combiner detecting the laser and guide laser beams, a first controller controlling the adjusting mechanism based on a first optical detection unit detection result, a beam steering unit downstream from the beam path combiner controlling travel directions of the laser and guide laser beams, a second optical detection unit downstream from the beam steering unit detecting the guide laser beam, and a second controller controlling the beam steering unit based on a second optical detection unit detection result.

7 Claims, 12 Drawing Sheets

(56) References Cited

OTHER PUBLICATIONS

An Office Action; "Notice of Reason for Rejection," issued by the Japanese Patent Office on Sep. 8, 2015, which corresponds to Japanese Patent Application No. 2011-224213 and is related to U.S. Appl. No. 14/238,405; with English language translation.

Communication pursuant to Article 94(3) EPC issued by the European Patent Office on Feb. 1, 2016, which corresponds to European Patent Application No. 12773112.3—1556 and is related to U.S. Appl. No. 14/238,405.

ALIGNMENT SYSTEM AND EXTREME ULTRAVIOLET LIGHT GENERATION SYSTEM

CROSS-REFERENCE TO RELATED APPLICATION

This application is the U.S. National Phase under 35 U.S.C. §371 of International Application No. PCT/IB2012/001713, filed on Sep. 5, 2012, which in turn claims the benefit of Japanese Application No. 2011-224213, filed on Oct. 11, 2011, the disclosures of which Applications are incorporated by reference herein.

BACKGROUND

1. Technical Field

This disclosure relates to an alignment system and an extreme ultraviolet (EUV) light generation system.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed in which a system for generating EUV light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

An alignment system according to one aspect of this disclosure, which may be used with a laser apparatus, may include a guide laser device configured to output a guide laser beam, an adjusting mechanism configured to adjust a travel direction of at least one of the guide laser beam and a laser beam from the laser apparatus, a beam path combiner configured to control a travel direction of the laser beam and a travel direction of the guide laser beam to substantially coincide with each other, a first optical detection unit provided downstream from the beam path combiner and configured to detect the laser beam and the guide laser beam, a first controller configured to control the adjusting mechanism based on a detection result of the first optical detection unit, a beam steering unit provided downstream from the beam path combiner and configured to control travel directions of the laser beam and the guide laser beam, a second optical detection unit provided downstream from the beam steering unit and configured to detect at least the guide laser beam, and a second controller configured to control the beam steering unit based on a detection result of the second optical detection unit.

An alignment system according to another aspect of this disclosure, which may be used with a laser apparatus, may include a guide laser device configured to output a guide laser beam, an adjusting mechanism configured to adjust a travel direction of at least one of the guide laser beam and a laser beam from the laser apparatus, a beam path combiner configured to control a travel direction of the laser beam and a travel direction of the guide laser beam to substantially coincide with each other, a beam steering unit provided downstream from the beam path combiner and configured to control travel directions of the laser beam and the guide laser beam, an optical detection unit provided downstream from the beam steering unit and configured to detect the laser beam and the guide laser beam, and a controller configured to control the adjusting mechanism and the beam steering unit based on a detection result of the optical detection unit.

BRIEF DESCRIPTION OF THE DRAWINGS

Hereinafter, selected embodiments of this disclosure will be described with reference to the accompanying drawings.

DETAILED DESCRIPTION

Figure 1:
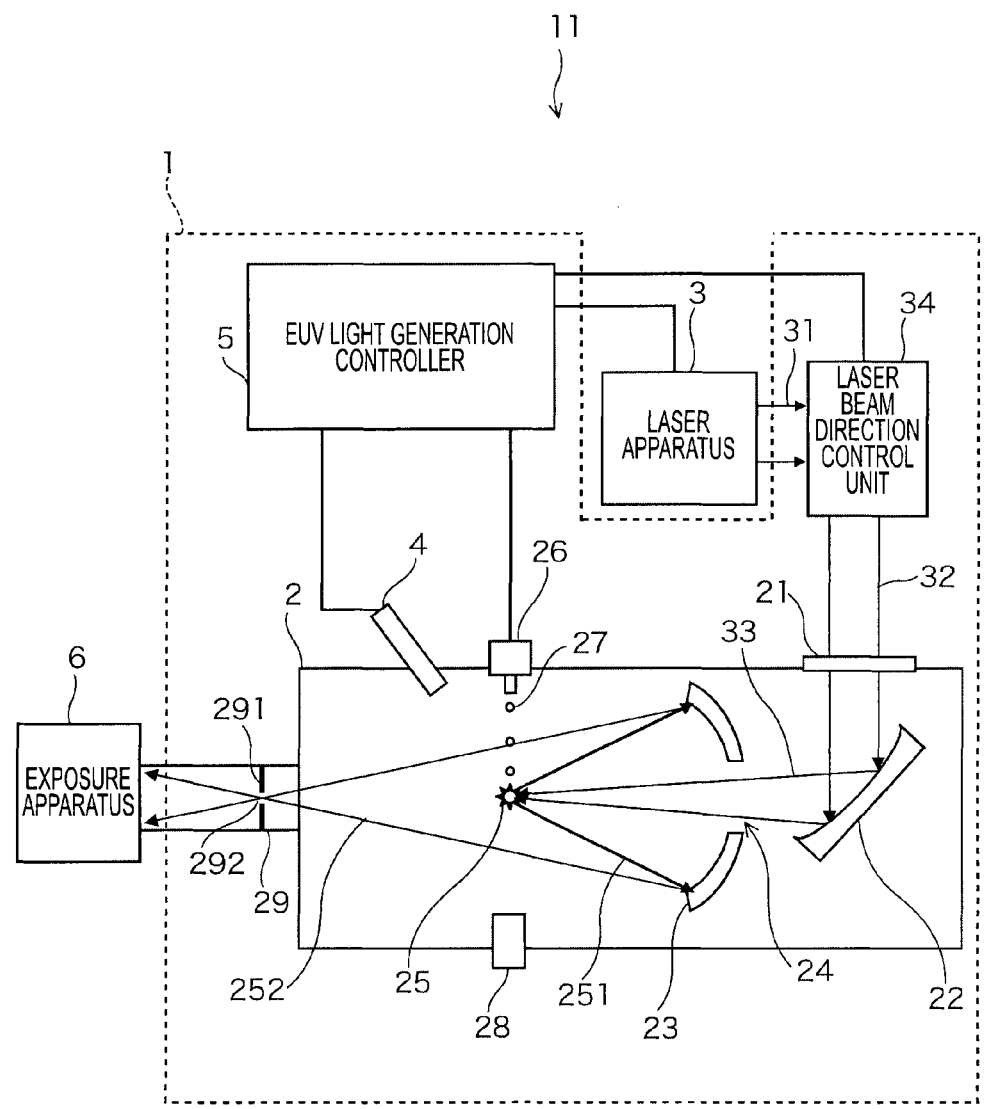
FIG. 1 schematically illustrates a configuration of an exemplary LPP-type EUV light generation system.

Hereinafter, selected embodiments of this disclosure will be described in detail with reference to the accompanying drawings. The embodiments to be described below are merely illustrative in nature and do not limit the scope of this disclosure. Further, the configuration(s) and operation(s) described in each embodiment are not all essential in implementing this disclosure. Note that like elements are referenced by like reference numerals and characters, and duplicate descriptions thereof will be omitted herein.

Contents
1. Overview
2. Overview of EUV Light Generation System
2.1 Configuration
2.2 Operation
3. EUV Light Generation System Including Alignment System: First Embodiment
3.1 Configuration
3.2 Operation
4. EUV Light Generation System Including Pre-pulse Laser Beam Apparatus: Second Embodiment
5. EUV Light Generation System Including Pre-pulse Laser Beam Apparatus: Third Embodiment
6. EUV Light Generation System Including Fast-Response Alignment System
7. EUV-Light Generation System Including Guide Laser Beam Adjusting Mechanism
8. Arrangement of Laser Amplifiers
9. Detectors
9.1 Detecting Beam Profiles at Two Positions
9.2 Detecting Beam Profile and Pointing
9.3 Using Shack-Hartmann Wavefront Sensor
9.4 Using Optical Position Detector
9.5 Combination of First through Fourth Examples
10. Supplementary Descriptions
10.1 Adjusting Mechanism
10.2 Actuator Unit 1. Overview In an LPP-type EUV light generation system, a target material may be irradiated inside a chamber with a laser beam outputted from a laser apparatus, to thereby be turned into plasma. Then, light including EUV light may be emitted from the plasma. The emitted EUV light may be collected by an EUV collector mirror provided in the chamber to be supplied into an external apparatus, such as an exposure apparatus. Optical elements for defining a beam path from the laser apparatus to the chamber may have their position, posture, and/or shape changed due to vibration in the laser apparatus, vibration in a beam steering unit provided between the laser apparatus and the chamber, and/or variation in temperature of the optical elements. As a result, the beam path may be changed.

According to one aspect of this disclosure, a guide laser beam may be outputted separately from a laser beam outputted from a laser apparatus, and beam paths of the laser beam and the guide laser beam may be controlled to coincide with each other. Then, the laser beam and the guide laser beam may be guided to the beam steering unit along the same beam path. The guide laser beam may then be detected downstream from the beam steering unit, and a detection result may be fed back to the beam steering unit. Accordingly, a focus of the laser beam may be controlled. Further, the guide laser beam may be outputted to control the beam steering unit even when the laser beam is not outputted. Hence, the focus of the laser beam when the laser apparatus is restarted may be controlled.

2. Overview of EUV Light Generation System
2.1 Configuration

FIG. 1 schematically illustrates a configuration of an exemplary LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply unit 26. The chamber 2 may be sealed airtight. The target supply unit 26 may be mounted onto the chamber 2, for example, to penetrate a wall of the chamber 2. A target material to be supplied by the target supply unit 26 may include, but is not limited to, tin, terbium, gadolinium, lithium, xenon, or any combination thereof.

The chamber 2 may have at least one through-hole or opening formed in its wall, and a pulse laser beam 32 may travel through the through-hole/opening into the chamber 2. Alternatively, the chamber 2 may have a window 21, through which the pulse laser beam 32 may travel into the chamber 2. An EUV collector mirror 23 having a spheroidal surface may, for example, be provided in the chamber 2. The EUV collector mirror 23 may have a multi-layered reflective film formed on the spheroidal surface thereof. The reflective film may include a molybdenum layer and a silicon layer, which are alternately laminated. The EUV collector mirror 23 may have a first focus and a second focus, and may be positioned such that the first focus lies in a plasma generation region 25 and the second focus lies in an intermediate focus (IF) region 292 defined by the specification of an external apparatus, such as an exposure apparatus 6. The EUV collector mirror 23 may have a through-hole 24 formed at the center thereof, and a pulse laser beam 33 may travel through the through-hole 24 toward the plasma generation region 25.

The EUV light generation system 11 may further include an EUV light generation controller 5 and a target sensor 4. The target sensor 4 may have an imaging function and detect at least one of the presence, the trajectory, and the position of a target 27.

Further, the EUV light generation system 11 may include a connection part 29 for allowing the interior of the chamber 2 to be in communication with the interior of the exposure apparatus 6. A wall 291 having an aperture may be provided in the connection part 29, and the wall 291 may be positioned such that the second focus of the EUV collector mirror 23 lies in the aperture formed in the wall 291.

The EUV light generation system 11 may also include a laser beam direction control unit 34, a laser beam focusing mirror 22, and a target collector 28 for collecting targets 27. The laser beam direction control unit 34 may include an optical element (not separately shown) for defining the direction into which the pulse laser beam 32 travels and an actuator (not separately shown) for adjusting the position and the orientation or posture of the optical element.

2.2 Operation

With continued reference to FIG. 1, a pulse laser beam 31 outputted from the laser apparatus 3 may pass through the laser beam direction control unit 34 and be outputted therefrom as a pulse laser beam 32 after having its direction optionally adjusted. The pulse laser beam 32 may travel through the window 21 and enter the chamber 2. The pulse laser beam 32 may travel inside the chamber 2 along at least one beam path from the laser apparatus 3, be reflected by the laser beam focusing mirror 22, and strike at least one target 27 as a pulse laser beam 33.

The target supply unit 26 may be configured to output the target(s) 27 toward the plasma generation region 25 in the chamber 2. The target 27 may be irradiated with at least one pulse of the pulse laser beam 33. Upon being irradiated with the pulse laser beam 33, the target 27 may be turned into plasma, and rays of light 251 including EUV light may be emitted from the plasma. At least the EUV light included in the light 251 may be reflected selectively by the EUV collector mirror 23. EUV light 252, which is the light reflected by the EUV collector mirror 23, may travel through the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control at least one of the timing at which the target 27 is outputted and the direction into which the target 27 is outputted. Furthermore, the EUV light generation controller 5 may be configured to control at least one of the timing at which the laser apparatus 3 oscillates, the direction in which the pulse laser beam 31 travels, and the position at which the pulse laser beam 33 is focused. It will be appreciated that the various controls mentioned above are merely examples, and other controls may be added as necessary.

Figure 2:
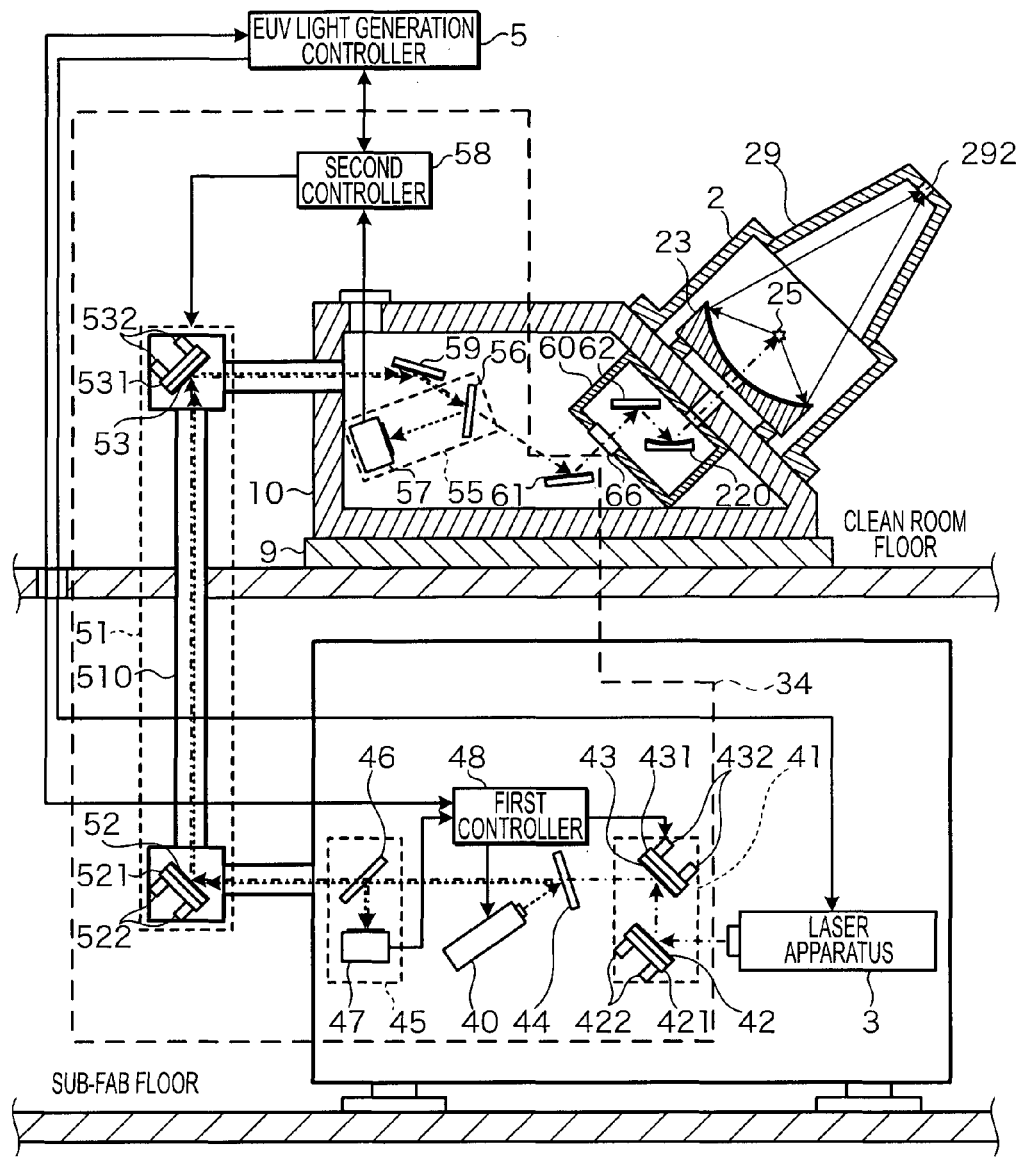
FIG. 2 is a partial sectional view illustrating an exemplary configuration of an EUV light generation system according to a first embodiment of this disclosure.

3. EUV Light Generation System Including Alignment System: First Embodiment 3.1 Configuration FIG. 2 is a partial sectional view illustrating an exemplary configuration of an EUV light generation system according to a first embodiment of this disclosure. In the first embodiment, the chamber 2 may be provided on a clean room floor, and the laser apparatus 3 may be provided on a sub-fab floor. The sub-fab floor may be located downstairs from the clean room floor. The laser beam direction control unit 34 may be provided across the clean room floor and the sub-fab floor to control a direction in which a laser beam travels from the laser apparatus 3 to the chamber 2.

On the sub-fab floor, the laser beam direction control unit 34 may include a guide laser device 40, a laser beam direction control mechanism 41, a beam path combiner 44, an optical detection unit 45, and a first controller 48.

The guide laser device 40 may be configured to output a guide laser beam. The guide laser device 40 may be a laser device configured to output a continuous-wave (CW) laser beam or a pulse laser beam at a predetermined repetition rate. Average output power of the guide laser beam may be smaller than average output power of the laser beam from the laser apparatus 3. Further, the guide laser beam may include a wavelength that differs from that of the laser beam from the laser apparatus 3.

The laser beam direction control mechanism 41 may include high-reflection mirrors 42 and 43. The high-reflection mirror 42 may be held by a mirror holder 421, and the mirror holder 421 may have its position and posture adjusted through an actuator unit 422. Similarly, the high-reflection mirror 43 may be held by a mirror holder 431, and the mirror holder 431 may have its position and posture adjusted through an actuator unit 432. As the positions and the postures of the mirror holders 421 and 431 are adjusted, a direction in which the laser beam from the laser apparatus 3 travels may be adjusted.

The beam path combiner 44 may be a dichroic mirror. The beam path combiner 44 may be positioned such that the laser beam from the laser apparatus 3 is incident on a first surface thereof and the guide laser beam from the guide laser device 40 is incident on a second surface thereof. The beam path combiner 44 may be configured to transmit the laser beam incident on the first surface and reflect the guide laser beam incident on the second surface. With this configuration, the beam path combiner 44 may serve to bring a beam path of the laser beam from the laser apparatus 3 and a beam path of the guide laser beam from the guide laser device 40 to substantially coincide with each other.

The optical detection unit 45 may include a beam sampler 46 and a detector 47. The beam sampler 46 may be configured to transmit a part of the laser beam from the laser apparatus 3 and reflect the remaining part thereof as a sample beam. The beam sampler 46 may also be configured to transmit a part of the guide laser beam from the guide laser device 40 and reflect the remaining part thereof as a sample beam. The detector 47 may include a photosensitive surface on which the sample beams are incident. The detector 47 may be configured to detect positions at which the respective sample beams are incident on the photosensitive surface thereof and output a detection result.

The first controller 48 may be configured to detect a deviation between a direction in which the laser beam transmitted through the beam path combiner 44 travels and a direction in which the guide laser beam reflected by the beam path combiner 44 travels based on a detection result of the detector 47. The first controller 48 may control the laser beam direction control mechanism 41 to reduce the deviation between the directions of the laser beam and the guide laser beam. In the laser beam direction control mechanism 41, an actuator driver (not separately shown) may receive a control signal from the first controller 48 to actuate each of the actuator units 422 and 423, to thereby control a direction in which the laser beam from the laser apparatus 3 travels. Further, the first controller 48 may send a control signal to the guide laser device 40 to cause the guide laser beam to be outputted or stopped at a desired timing.

In a region across the sub-fab floor and the clean room floor, the laser beam direction control unit 34 may include a beam steering unit 51. The beam steering unit 51 may include a hollow optical pipe 510, and dry air or an inert gas may be introduced into the optical pipe 510. The beam steering unit 51 may guide the laser beam and the guide laser beam transmitted through the beam sampler 46 onto the clean room floor.

The beam steering unit 51 may further include high-reflection mirrors 52 and 53. The high-reflection mirror 52 may be held by a mirror holder 521, and the mirror holder 521 may have its position and posture adjusted through an actuator unit 522. Similarly, the high-reflection mirror 53 may be held by a mirror holder 531, and the mirror holder 531 may have its position and posture adjusted through an actuator unit 532. As the positions and the postures of the high-reflection mirrors 52 and 53 are adjusted, directions in which the laser beam and the guide laser beam travel may be controlled.

The chamber 2 may be fixed to a reference member 10 on the clean room floor. The reference member 10 may be fixed to the floor through an installation unit 9. The reference member 10 may include a space in which a group of optical elements forming a part of the laser beam direction control unit 34 and a mirror housing 60 are provided. A laser beam focusing mirror 220 may be provided in the mirror housing 60.

On the clean room floor, the laser beam direction control unit 34 may include an optical detection unit 55, a second controller 58, and high-reflection mirrors 59 and 61. The optical detection unit 55 and the high-reflection mirrors 59 and 61 may be provided in the reference member 10.

The high-reflection mirror 59 may be positioned to reflect the laser beam and the guide laser beam guided onto the clean room floor through the beam steering unit 51 toward the optical detection unit 55.

The optical detection unit 55 may include a beam splitter 56 and a detector 57. The beam splitter 56 may be configured and positioned to transmit the laser beam reflected by the high-reflection mirror 59 toward the high-reflection mirror 61 with high transmittance. The beam splitter 56 may also be configured and positioned to reflect the guide laser beam reflected by the high-reflection mirror 59 toward the detector 57 with high reflectance as a sample beam. The detector 57 may include a photosensitive surface on which the sample beam is incident. The detector 57 may be configured to detect a position at which the sample beam is incident on the photosensitive surface and output a detection result.

The second controller 58 may be configured to control the beam steering unit 51 based on a detection result of the detector 57 so that the laser beam is focused in the plasma generation region 25. In the beam steering unit 51, an actuator driver (not separately shown) may receive a control signal from the second controller 58 to actuate each of the actuator units 522 and 532, to thereby control directions in which the laser beam and the guide laser beam travel.

The high-reflection mirror 61 may be positioned to reflect the laser beam transmitted through the beam splitter 56 toward the mirror housing 60. A window 66 may be provided in the mirror housing 60, and the laser beam reflected by the high-reflection mirror 61 may be transmitted through the window 66 with high transmittance. The laser beam transmitted through the window 66 may be reflected by a flat mirror 62 with high reflectance, reflected by the laser beam focusing mirror 220 with high reflectance, and be focused on a target supplied to the plasma generation region 25.

3.2 Operation

Figure 3:
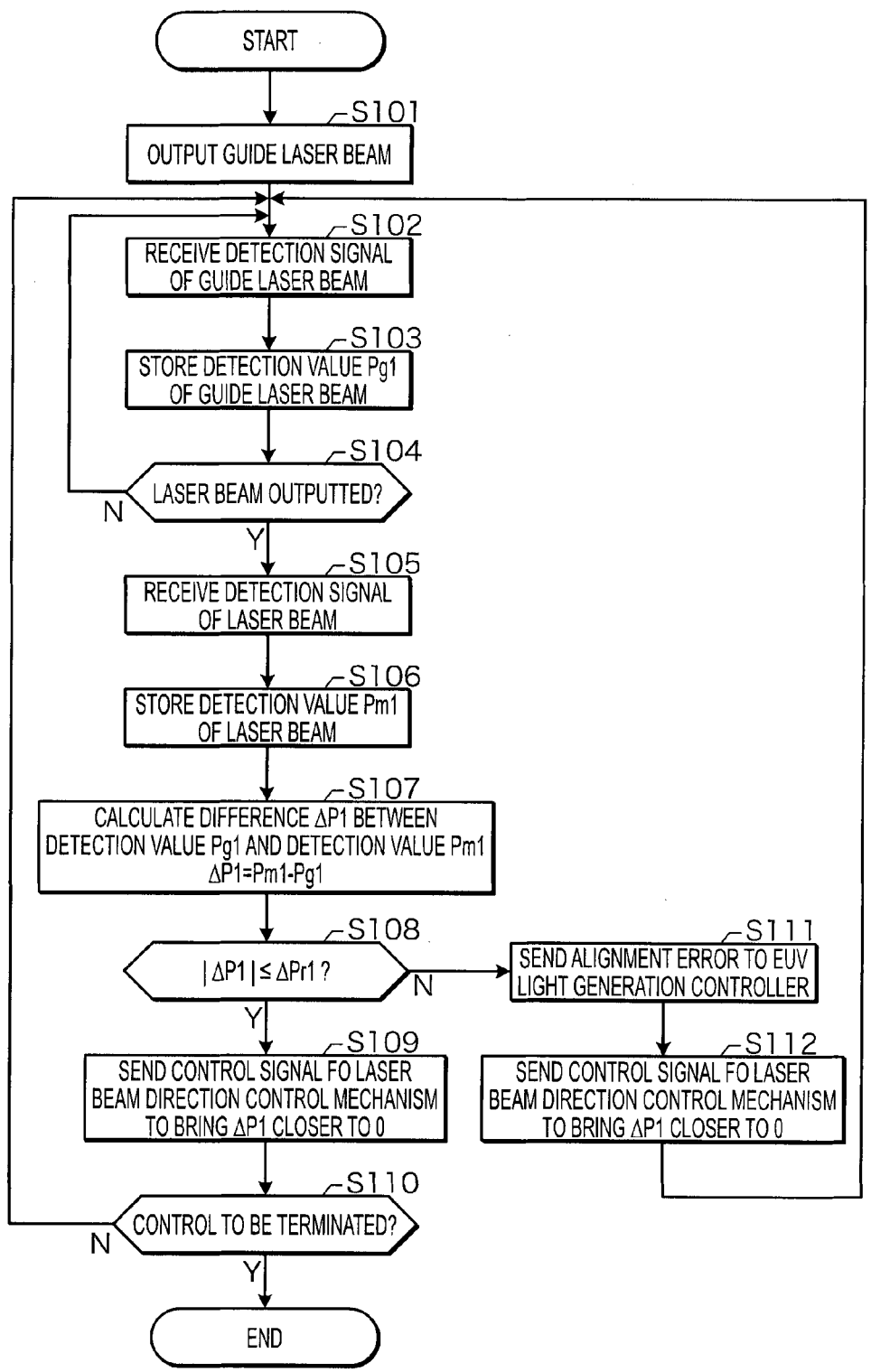
FIG. 3 is a flowchart showing an exemplary operation of a first controller in the first embodiment.

FIG. 3 is a flowchart showing an exemplary operation of the first controller in the first embodiment. The first controller 48 may carry out the following operation to detect the laser beam and the guide laser beam and control the laser beam direction control mechanism 41 to reduce a deviation between directions in which the laser beam and the guide laser beam travel.

The first controller 48 may first send a control signal to the guide laser device 40 to cause the guide laser device 40 to start outputting a guide laser beam (Step S101). The first controller 48 may then receive a detection signal of the guide laser beam from the detector 47 (Step S102). The first controller 48 may store a detection value Pg1 of the guide laser beam included in the detection signal (Step S103). The detection value Pg1 may include a value indicating a position at which the guide laser beam is incident on the photosensitive surface of the detector 47. The detection value Pg1 may be coordinate information indicating the calculated centroid in a beam intensity distribution of the detected guide laser beam.

Then, the first controller 48 may receive a signal from the EUV light generation controller 5 and determine whether or not the laser apparatus 3 has started outputting a laser beam (Step S104). When the laser beam has not been outputted (Step S104; NO), the first controller 48 may return to Step S102 to detect the guide laser beam. On the other hand, when the laser beam has been outputted (Step S104; YES), the first controller 48 may receive a detection signal of the laser beam from the detector 47 (Step S105). The first controller 48 may store a detection value Pm1 of the laser beam included in the detection signal (Step S106). The detection value Pm1 may include a value indicating a position at which the laser beam is incident on the photosensitive surface of the detector 47. The detection value Pm1 may be coordinate information indicating the calculated centroid in a beam intensity distribution of the detected laser beam.

Thereafter, the first controller 48 may calculate a difference $\Delta P1$ between the detection value Pg1 and the detection value Pm1 through the following expression (Step S107).

$$\Delta P1 = Pm1 - Pg1$$

When both the detection value Pg1 and the detection value Pm1 are coordinate information, the difference $\Delta P1$ may include a difference along each corresponding coordinate.

Subsequently, the first controller 48 may determine whether or not an absolute value $|\Delta P1|$ of the difference $\Delta P1$ is equal to or smaller than a predetermined threshold value $\Delta Pr1$, ($|\Delta 11| \leq \Delta Pr1$) (Step S108). When both the detection value Pg1 and the detection value Pm1 are coordinate information, the threshold value $\Delta Pr1$ may include a permissible range along each corresponding coordinate.

When the absolute value $|\Delta P1|$ is equal to or smaller than the threshold value $\Delta Pr1$ (Step S108; YES), the first controller 48 may proceed to Step S109. The first controller 48 may then send a control signal to the laser beam direction control mechanism 41 to bring the difference $\Delta P1$ closer to 0 (Step S109). Subsequently, the first controller 48 may receive a signal from the EUV light generation controller 5 to determine whether or not the operation in this flowchart is to be terminated (Step S110). When a signal indicating termination of the control is received from the EUV light generation controller 5 (Step S110; YES), the operation may be terminated. When a signal indicating termination of the control is not received (Step S110; NO), the first controller 48 may return to Step S102 to detect the guide laser beam.

On the other hand, when the absolute value $|\Delta P1|$ exceeds the threshold value $\Delta Pr1$ (Step S108; NO), the first controller 48 may proceed to Step S111. The first controller 48 may send a signal indicating an alignment error to the EUV light generation controller 5 (Step S111). The first controller 48 may then send a control signal to the laser beam direction control mechanism 41 to bring the difference $\Delta P1$ closer to 0, as in Step S109 (Step S112). Thereafter, the first controller 48 may return to Step S102 to detect the guide laser beam.

Figure 4:
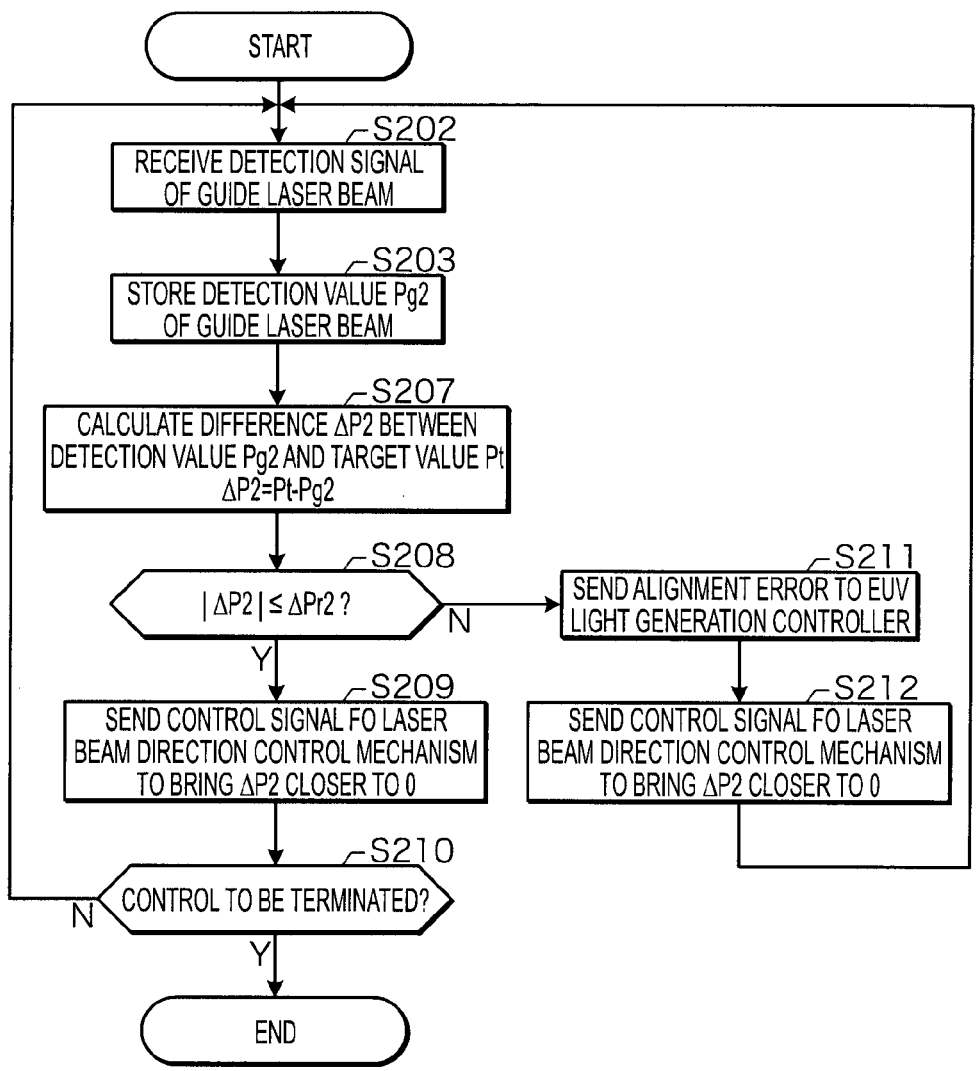
FIG. 4 is a flowchart showing an exemplary operation of a second controller in the first embodiment.

FIG. 4 is a flowchart showing an exemplary operation of the second controller in the first embodiment. The second controller 58 may be configured to carry out the following operation to detect the guide laser beam and control the beam steering unit 51 so that the laser beam is focused in the plasma generation region 25.

The second controller 58 may first receive a detection signal of the guide laser beam from the detector 57 (Step S202). The second controller 58 may store a detection value Pg2 of the guide laser beam included in the detection signal (Step S203). The detection value Pg2 may include a value indicating a position at which the guide laser beam is incident on the photosensitive surface of the detector 57. The detection value Pg2 may be coordinate information indicating the calculated centroid in a beam intensity distribution of the detected guide laser beam.

Then, the second controller 58 may calculate a difference $\Delta P2$ between the detection value Pg2 and a target value Pt through the following expression (Step S207).

$$\Delta P2 = Pt - Pg2$$

The target value Pt may serve to focus the laser beam in the plasma generation region 25 and may, for example, be held in the second controller 58 in advance. When the detection value Pg2 is coordinate information, the target value Pt may include a target value along each corresponding coordinate. Further, the difference ΔP2 may include a difference along each corresponding coordinate.

Subsequently, the second controller 58 may determine whether or not an absolute value |ΔP2| of the difference ΔP2 is equal to or smaller than a predetermined threshold value ΔPr2, (|ΔP2|≤ΔPr2) (Step S208). When both the detection value Pg2 and the target value Pt are coordinate information, the threshold value ΔPr2 may include a permissible range along each corresponding coordinate.

When the absolute value |ΔP2| is equal to or smaller than the threshold value ΔPr2 (Step S208; YES), the second controller 58 may proceed to Step S209. The second controller 58 may then send a control signal to the beam steering unit 51 to bring the difference ΔP2 closer to 0 (Step S209). Subsequently, the second controller 58 may receive a signal from the EUV light generation controller 5 to determine whether or not the operation in this flowchart is to be terminated (Step S210). When a signal indicating termination of the control is received from the EUV light generation controller 5 (Step S210; YES), the operation may be terminated. When a signal indicating termination of the control is not received (Step S210; NO), the second controller 58 may return to Step S202 to detect the guide laser beam.

On the other hand, when the absolute value |ΔP2| exceeds the threshold value ΔPr2 (Step S208; NO), the second controller 58 may proceed to Step S211. The second controller 58 may send a signal indicating an alignment error to the EUV light generation controller 5 (Step S211). The second controller 58 may then send a control signal to the beam steering unit 51 to bring the difference ΔP2 closer to 0, as in Step S209 (Step S212). Thereafter, the second controller 58 may return to Step S202 to detect the guide laser beam.

According to the first embodiment, the guide laser beam may be detected downstream from the beam steering unit 51, and a detection result may be fed back to the beam steering unit 51. Accordingly, a focus of the laser beam may be controlled. Further, according to the first embodiment, the laser beam and the guide laser beam may be detected downstream from the beam path combiner 44, and a detection result is fed back to the laser beam direction control mechanism 41. Accordingly, a deviation between a direction in which the laser beam travels and a direction in which the guide laser beam travels may be reduced. Furthermore, the guide laser beam may be outputted to control the beam steering unit 51 even when the laser beam is not outputted. Hence, the focus of the laser beam when the laser apparatus 3 is restarted may be controlled.

The beam splitter 56 may be configured to not only reflect the guide laser beam but also reflect a part of the laser beam toward the detector 57 as a sample beam. Then, the detector 57 may also receive the laser beam reflected by the beam splitter 56 and output a detection result. In this case, a curvature of the wavefront of the laser beam may be calculated by the first and second controllers 48 and 58, and a position where a distortion, if any, occurs in the wavefront may be identified.

Figure 5:
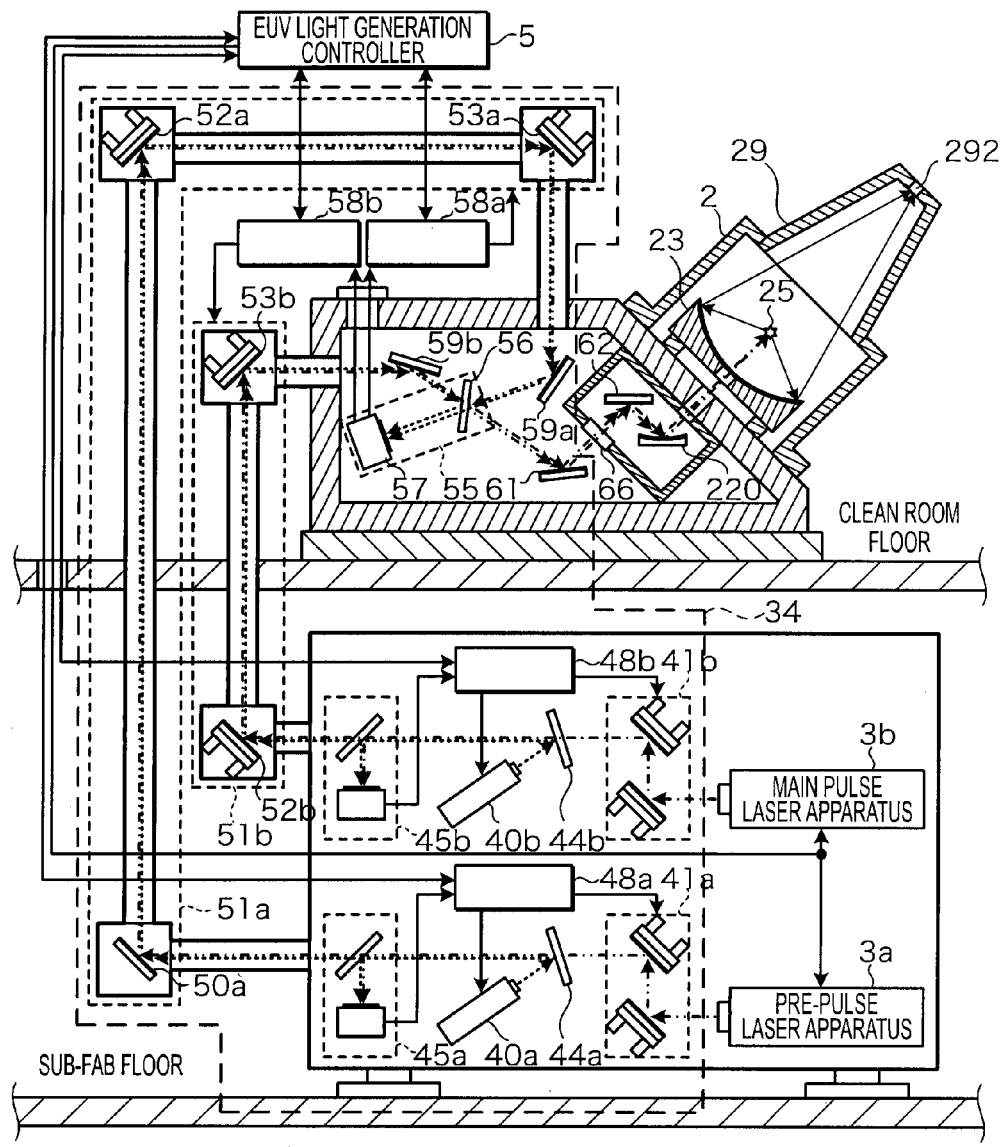
FIG. 5 is a partial sectional view illustrating an exemplary configuration of an EUV light generation system according to a second embodiment of this disclosure.

4. EUV Light Generation System Including Pre-pulse Laser Apparatus: Second Embodiment FIG. 5 is a partial sectional view illustrating an exemplary configuration of an EUV light generation system according to a second embodiment. In the second embodiment, a target may first be irradiated with a pre-pulse laser beam, to thereby be diffused, and this diffused target may then be irradiated with a main pulse laser beam, to thereby be turned into plasma. For example, a laser beam outputted from a Yttrium Aluminum Garnet (YAG) laser apparatus at a wavelength of 1.06 μm may be used as a pre-pulse laser beam, and a laser beam outputted from a carbon-dioxide ($CO_2$) laser apparatus at a wavelength of 10.6 μm may be used as a main pulse laser beam.

As shown in FIG. 5, a pre-pulse laser apparatus 3a configured to output a pre-pulse laser beam and a main pulse laser apparatus 3b configured to output a main pulse laser beam may be provided on the sub-fab floor.

On the sub-fab floor, the laser beam direction control unit 34 may include a first guide laser device 40a, a laser beam direction control mechanism 41a, a beam path combiner 44a, an optical detection unit 45a, and a first controller 48a. The configuration and the operation of the optical detection unit 45a may be similar to the configuration and the operation of the optical detection unit 45 in the first embodiment. In a region across the sub-fab floor and the clean room floor, the laser beam direction control unit 34 may include a beam steering unit 51a. The beam steering unit 51a may include high-reflection mirrors 50a, 52a, and 53a. An actuator unit may be provided on each of the high-reflection mirrors 52a and 53a. The operation of the beam steering unit 51a may be similar to the operation of the beam steering unit 51 in the first embodiment. On the clean room floor, the laser beam direction control unit 34 may include a second controller 58a and a high-reflection mirror 59a. A part of the laser beam direction control unit 34 which includes the aforementioned elements may be provided to control a direction in which the pre-pulse laser beam travels from the pre-pulse laser apparatus 3a.

On the sub-fab floor, the laser beam direction control unit 34 may include a second guide laser device 40b, a laser beam direction control mechanism 41b, a beam path combiner 44b, an optical detection unit 45b, and a first controller 48b. The configuration and the operation of the optical detection unit 45b may be similar to the configuration and the operation of the optical detection unit 45 in the first embodiment. In a region across the sub-fab floor and the clean room floor, the laser beam direction control unit 34 may include a beam steering unit 51b. The beam steering unit 51b may include high-reflection mirrors 52b and 53b. The operation of the beam steering unit 51b may be similar to the operation of the beam steering unit 51 in the first embodiment. On the clean room floor, the laser beam direction control unit 34 may include a second controller 58b and a high-reflection mirror 59b. A part of the laser beam direction control unit 34 which includes the aforementioned elements may be provided to control a direction in which the main pulse laser beam travels from the main pulse laser apparatus 3b.

For example, a first guide laser beam may be outputted from the first guide laser device 40a at a wavelength of 635 nm, and a second guide laser beam may be outputted from the second guide laser device 40b at a wavelength of 532 nm.

The high-reflection mirror 59a may be configured to reflect the pre-pulse laser beam and the first guide laser beam with high reflectance. The high-reflection mirror 59b may be configured to reflect the main pulse laser beam and the second guide laser beam with high reflectance. The pre-pulse laser beam and the first guide laser beam reflected by the high-reflection mirror 59a may be incident on a first surface of the beam splitter 56. The main pulse laser beam and the second guide laser beam reflected by the high-reflection mirror 59b may be incident on a second surface of the beam splitter 56.

The beam splitter 56 may be configured and positioned to reflect the pre-pulse laser beam incident on the first surface thereof toward the high-reflection mirror 61 with high reflectance. Further, the beam splitter 56 may be configured and positioned to transmit the first guide laser beam incident on the first surface thereof toward the detector 57 with high transmittance. Furthermore, the beam splitter 56 may be configured and positioned to transmit the main pulse laser beam incident on the second surface thereof toward the high-reflection mirror 61 with high transmittance. Further, the beam splitter 56 may be configured and positioned to reflect the second guide laser beam incident on the second surface thereof toward the detector 57 with high reflectance. The detector 57 may have a photosensitive surface sensitive to both the first guide laser beam and the second guide laser beam. The beam splitter 56 may serve as a beam combiner to control a direction in which the pre-pulse laser beam travels and a direction in which the main pulse laser beam travels to coincide with each other. The beam splitter 56 may, for example, include diamond.

The high-reflection mirror 61 may reflect the pre-pulse laser beam and the main pulse laser beam incident thereon with high reflectance. The pre-pulse laser beam and the main pulse laser beam reflected by the high-reflection mirror 61 may be transmitted through the window 66 with high transmittance. The pre-pulse laser beam and the main pulse laser beam transmitted through the window 66 may then be reflected by the flat mirror 62 with high reflectance. Thereafter, each of the pre-pulse laser beam and the main pulse laser beam reflected by the flat mirror 62 may be focused in the plasma generation region 25 by the laser beam focusing mirror 220.

According to the second embodiment, even in a case where a target is irradiated with a pre-pulse laser beam and a diffused target is then irradiated with a main pulse laser beam, a focus of the pre-pulse laser beam and a focus of the main pulse laser beam may be controlled. Further, the guide laser beams may be outputted to control the beam steering units 51*a* and 51*b* even when the pre-pulse laser beam and the main pulse laser beam are not outputted. Hence, the focuses of the pre-pulse laser beam and the main pulse laser beam when the laser apparatuses are restarted may be controlled.

Here, the beam splitter 56 may be configured and positioned to transmit a part of the pre-pulse laser beam incident on the first surface thereof toward the detector 57 as a sample beam. Further, the beam splitter 56 may be configured and positioned to reflect a part of the main pulse laser beam incident on the second surface thereof toward the detector 57 as a sample beam. Then, the detector 57 may receive these sample beams in addition to the first and second guide laser beams and output a detection result. In this case, curvatures of the wavefront of the pre-pulse laser beam and the main pulse laser beam may be calculated respectively by the first controllers 48*a*, 48*b*, and second controllers 58*a*, and 58*b*, and a position where a distortion, if any, occurs in the wavefront may be identified.

Figure 6:
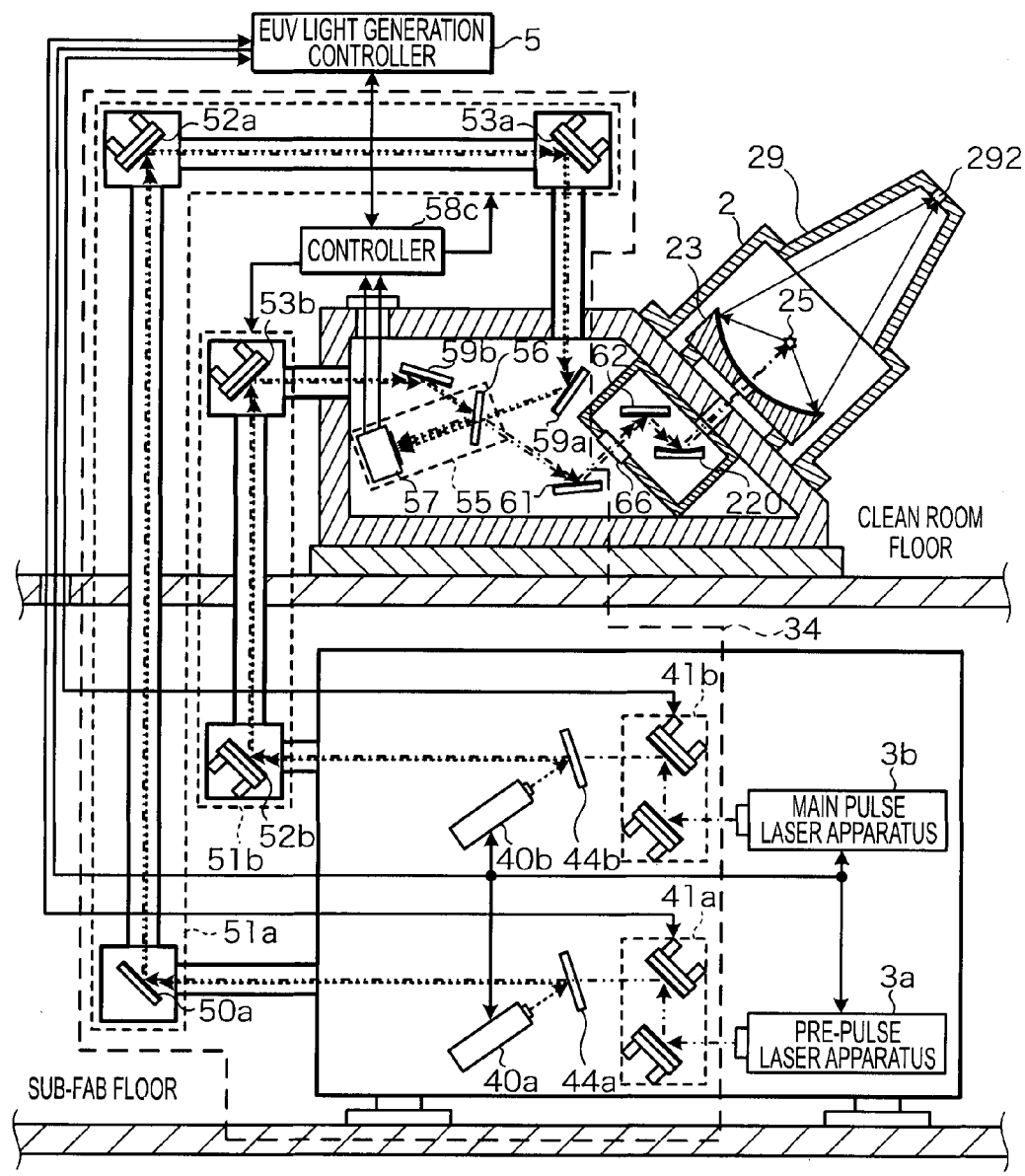
FIG. 6 is a partial sectional view illustrating an exemplary configuration of an EUV light generation system according to a third embodiment of this disclosure.

5. EUV Light Generation System Including Pre-pulse Laser Apparatus: Third Embodiment FIG. 6 is a partial sectional view illustrating an exemplary configuration of an EUV light generation system according to a third embodiment. In the third embodiment, the laser beam direction control unit 34 may not include the optical detection units 45*a* and 45*b* and the first controllers 48*a* and 48*b* of the second embodiment.

In the third embodiment, the beam splitter 56 may be configured and positioned to reflect the pre-pulse laser beam incident on the first surface thereof toward the high-reflection mirror 61 with high reflectance and transmit a part of the pre-pulse laser beam incident on the first surface thereof toward the detector 57 as a sample beam. Further, the beam splitter 56 may be configured and positioned to transmit the first guide laser beam incident on the first surface thereof toward the detector 57 with high transmittance. Furthermore, the beam splitter 56 may be configured and positioned to transmit the main pulse laser beam incident on the second surface thereof toward the high-reflection mirror 61 with high transmittance and reflect a part of the main pulse laser beam incident on the second surface thereof toward the detector 57 as a sample beam. Further, the beam splitter 56 may be configured and positioned to reflect the second guide laser beam incident on the second surface thereof toward the detector 57 with high reflectance.

The detector 57 may have a photosensitive surface sensitive to the pre-pulse laser beam, the first guide laser beam, the main pulse laser beam, and the second guide laser beam. The detector 57 may detect a position at which each of the pre-pulse laser beam and the first guide laser beam is incident on the photosensitive surface thereof and a position at which each of the main pulse laser beam and the second guide laser beam is incident on the photosensitive surface thereof, and output a detection result.

A controller 58*c* may be configured to control the laser beam direction control mechanisms 41*a* and 41*b* and the beam steering units 51*a* and 51*b* based on a detection result of the detector 57. That is, the controller 58*c* may be configured to control the laser beam direction control mechanism 41*a* based on a detection result of the pre-pulse laser beam and the first guide laser beam of the detector 57 so that a deviation between a direction in which the pre-pulse laser beam travels and a direction in which the first guide laser beam travels is reduced. Further, the controller 58*c* may be configured to control the laser beam direction control mechanism 41*b* based on a detection result of the main pulse laser beam and the second guide laser beam of the detector 57 so that a deviation between a direction in which the main pulse laser beam travels and a direction in which the second guide laser beam travels is reduced.

Further, the controller 58*c* may be configured to control the beam steering unit 51*a* based on a detection result of at least one of the first guide laser beam and the pre-pulse laser beam of the detector 57 so that the pre-pulse laser beam is focused in the plasma generation region 25. Further, the controller 58*c* may be configured to control the beam steering unit 51*b* based on a detection result of at least one of the second guide laser beam and the main pulse laser beam of the detector 57 so that the main pulse laser beam is focused in the plasma generation region 25.

In the third embodiment as well, a focus of the pre-pulse laser beam and a focus of the main pulse laser beam may be controlled. Further, the guide laser beams may be outputted to control the beam steering units 51*a* and 51*b* even when the pre-pulse laser beam and the main pulse laser beam are not outputted. Hence, the focuses of the pre-pulse laser beam and the main pulse laser beam when the laser apparatuses are restarted may be controlled.

6. EUV Light Generation System Including Fast-Response Alignment System

Figure 7:
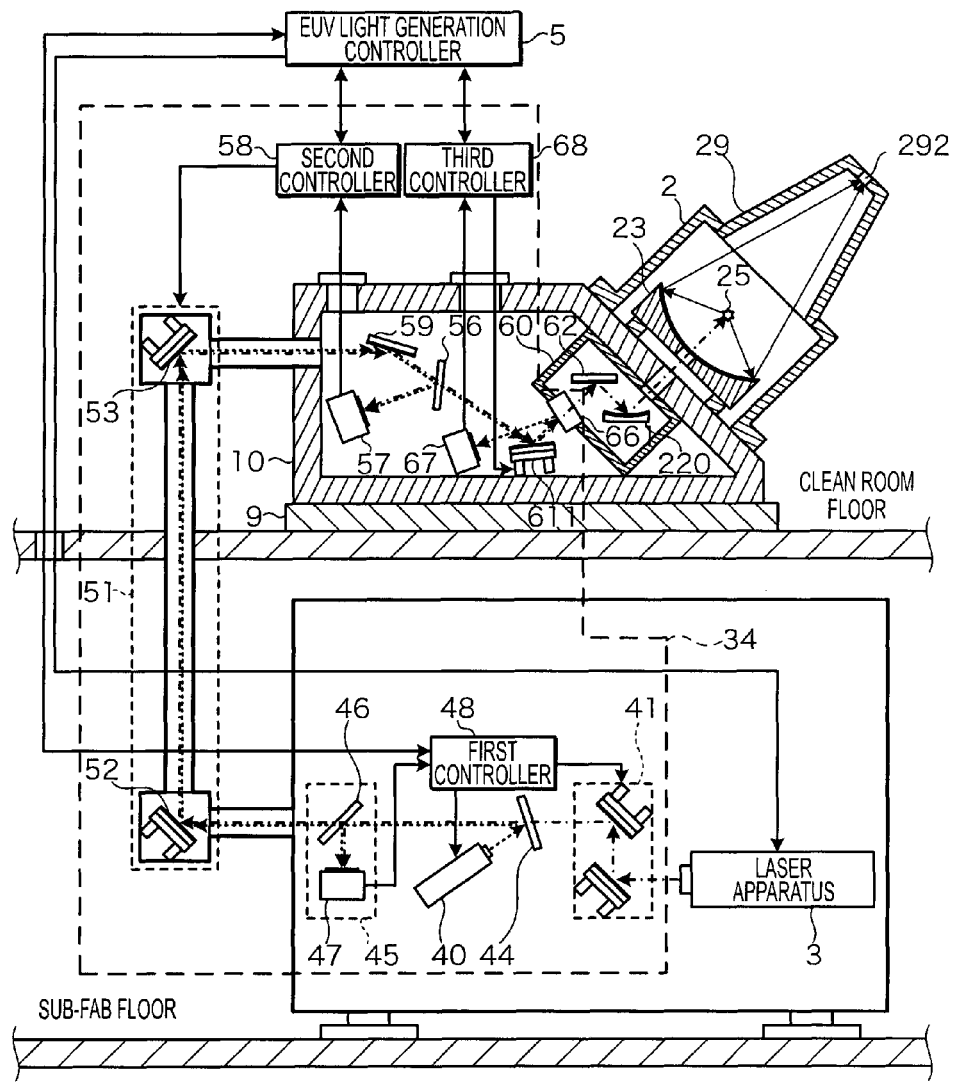
FIG. 7 is a partial sectional view illustrating an exemplary configuration of an EUV light generation system according to a fourth embodiment of this disclosure.

FIG. 7 is a partial sectional view illustrating an exemplary configuration of an EUV light generation system according to a fourth embodiment. In the fourth embodiment, a mechanism configured to detect a laser beam reflected by a window 661 in the mirror housing 60 and to control a direction in which the laser beam travels may be provided.

As shown in FIG. 7, the beam splitter 56 may be configured to transmit a part of the guide laser beam in addition to the laser beam. A steering mirror 611 may then be provided in a beam path of the laser beam and the guide laser beam transmitted through the beam splitter 56. The steering mirror 611 may be positioned to reflect the laser beam and the guide laser beam toward the window 661. The window 661 may be positioned such that the laser beam and the guide laser beam are incident thereon at an angle. The window 661 may be configured to transmit the laser beam with high transmittance and reflect the guide laser beam with high reflectance.

A detector 67 may be provided in a beam path of the guide laser beam reflected by the window 661. The detector 67 may be a fast-response optical position detector, such as a position-sensitive detector (PSD), configured to detect the centroid of the laser beam at the photosensitive surface. The centroid of the laser beam detected by the detector 67 may be inputted to a third controller 68. The third controller 68 may be configured to control the posture of the steering mirror 611 based on a detection result of the detector 67 so that the laser beam is focused in the plasma generation region 25. The steering mirror 611 may include an actuator capable of adjusting the posture of the steering mirror 611 at high speed using a piezoelectric element.

According to the fourth embodiment, for a variation in a direction in which the guide laser beam travels, a variation with large amplitude at low frequency may be compensated by controlling the beam steering unit 51 through the second controller 58. On the other hand, for a variation in a direction in which the guide laser beam travels, a variation with small amplitude at high frequency may be compensated by controlling the steering mirror 611 through the third controller 68. Accordingly, the focus of the laser beam may be controlled.

7. EUV Light Generation System Including Guide Laser Beam Adjusting Mechanism

Figure 8:
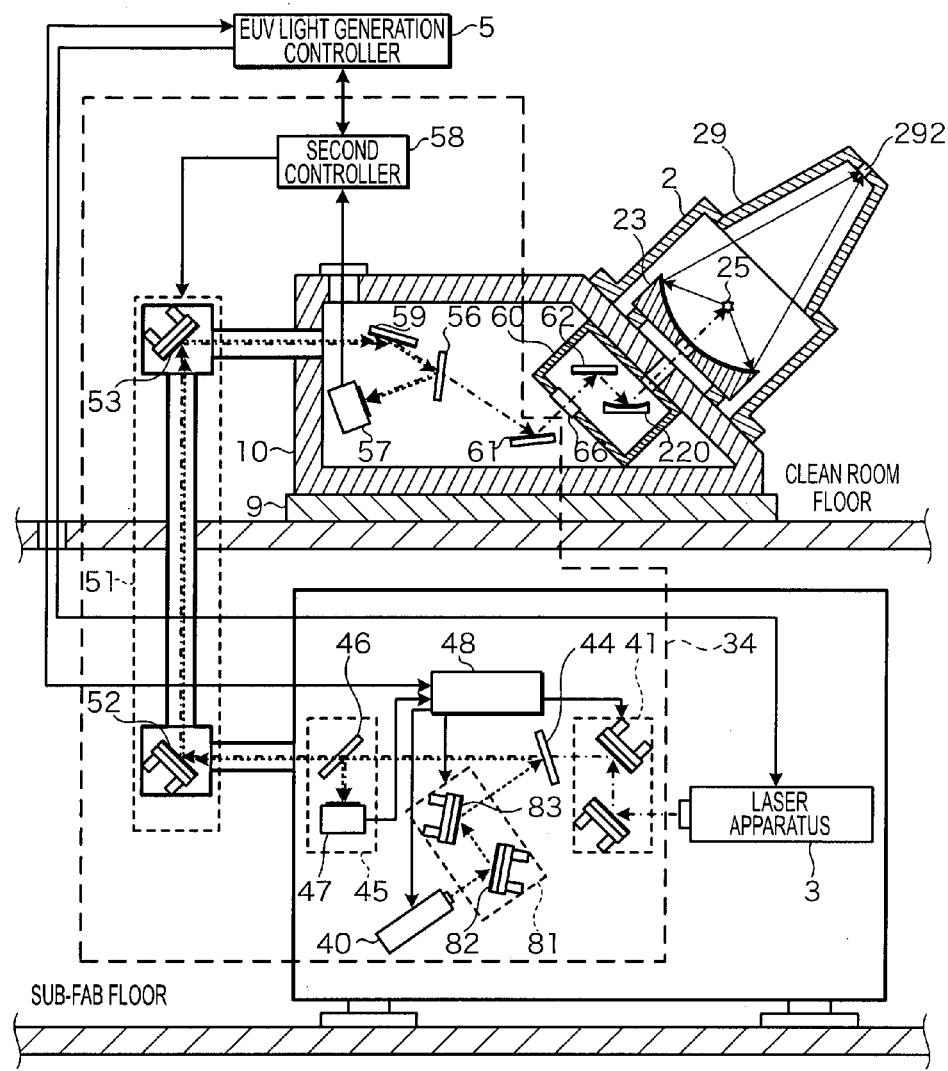
FIG. 8 is a partial sectional view illustrating an exemplary configuration of an EUV light generation system according to a fifth embodiment of this disclosure.

FIG. 8 is a partial sectional view illustrating an exemplary configuration of an EUV light generation system according to a fifth embodiment. In the fifth embodiment, an adjusting mechanism 81 may be provided between the guide laser device 40 and the beam path combiner 44 to adjust a direction in which the guide laser beam travels.

The adjusting mechanism 81 may include high-reflection mirrors 82 and 83. Each of the high-reflection mirrors 82 and 83 may have its position and posture adjusted by an actuator unit, as in the above-described high-reflection mirrors 42 and 43. As the positions and the postures of the high-reflection mirrors 82 and 83 are adjusted, a direction in which the guide laser beam from the guide laser device 40 travels may be controlled.

The first controller 48 may be configured to control the adjusting mechanism 81 based on a detection result of the detector 47 so that a deviation between a direction in which the laser beam from the laser apparatus 3 travels and a direction in which the guide laser beam from the guide laser device 40 travels is reduced. In this case, an optical element without a mechanism to adjust a direction in which a laser beam travels may be used in place of the laser beam direction control mechanism 41 configured to adjust a direction in which the laser beam from the laser apparatus 3 travels.

8. Arrangement of Laser Amplifiers

Figure 9:
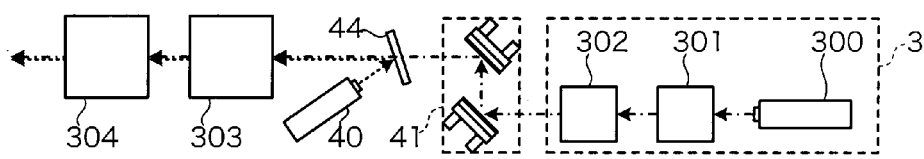
FIG. 9 schematically illustrates a part of a laser beam direction control unit in an EUV light generation system according to a sixth embodiment of this disclosure.

FIG. 9 schematically illustrates a part of a laser beam direction control unit in an EUV light generation system according to a sixth embodiment. In the sixth embodiment, the laser apparatus 3 may include a master oscillator 300 and amplifiers 301 and 302. Amplifiers 303 and 304 may be further provided downstream from the guide laser device 40, the laser beam direction control mechanism 41, and the beam path combiner 44 constituting a part of the laser beam direction control unit 34. The amplifiers 303 and 304 may be provided on the sub-fab floor.

The master oscillator 300 may be configured to output a seed beam of a laser beam for turning a target into plasma. The amplifier 301 may amplify the seed beam from the master oscillator 300, and the amplifier 302 may further amplify the amplified laser beam from the amplifier 301.

The laser beam direction control mechanism 41 may be configured and positioned to control a direction in which a laser beam from the amplifier 302 travels. The guide laser device 40 may be configured to output a guide laser beam. The beam path combiner 44 may serve to bring a beam path of the laser beam through the laser beam direction control mechanism 41 and a beam path of the guide laser beam from the guide laser device 40 to substantially coincide with each other.

The amplifier 303 may amplify at least the combined laser beam of the laser beam and the guide laser beam from the beam path combiner 44. The amplifier 304 may further amplify at least the combined laser beam of the laser beam and the guide laser beam from the amplifier 303. The laser beam and the guide laser beam outputted from the amplifier 304 may enter the optical detection unit 45, 45a, or 45b described in the first or second embodiment. Alternatively, the laser beam and the guide laser beam from the amplifier 304 may enter the beam steering unit 51, 51a, or 51b described in the third embodiment. Further, as described in the fifth embodiment, the adjusting mechanism 81 may be provided between the guide laser device 40 and the beam path combiner 44.

In the EUV light generation system, a target may need to be irradiated with a high-power laser beam in order to output EUV light having desired energy. When the power of the laser beam is increased, optical elements provided in a beam path of the laser beam may be more likely to deform due to a head load. Accordingly, a direction in which the laser beam travels may be changed. In particular, when multiple amplifiers are used, the power of the laser beam may be increased at a downstream-side amplifier. Accordingly, a change in a direction in which the laser beam travels may be greater at an output part of the downstream amplifier, and a control amount for bringing the beam paths of the laser beam and the guide laser beam to coincide with each other may be increased.

According to the sixth embodiment, the laser beam direction control mechanism 41 and the beam path combiner 44 may be provided between the amplifiers, and the beam paths of the laser beam and the guide laser beam may be controlled to coincide with each other while a change in a direction in which the laser beam travels is small. Accordingly, a control amount by the laser beam direction control mechanism 41 to reduce the deviation between the directions of the laser beam and the guide laser beam may be reduced. When the control amount by the laser beam direction control mechanism 41 is kept small, the laser beam direction control mechanism 41 may be driven at higher speed and with higher precision.

9. Detectors 9.1 Detecting Beam Profiles at Two Positions

Figure 10A:
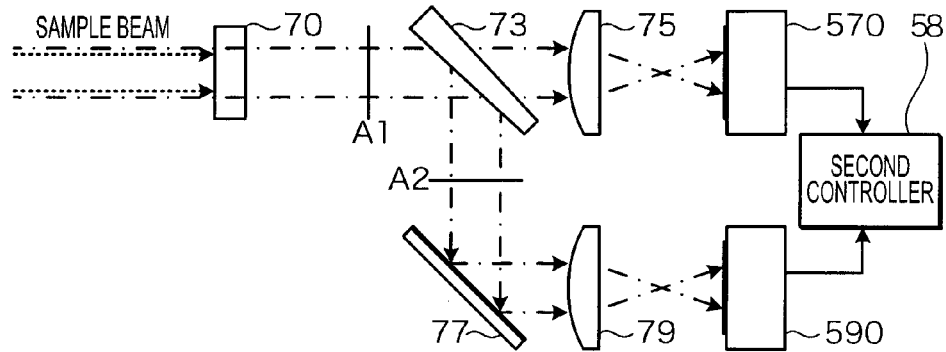
FIG. 10A schematically illustrates an exemplary configuration of a first example of a detector in an EUV light generation system according to an embodiment of this disclosure.

FIG. 10A schematically illustrates an exemplary configuration of a first example of a detector in an EUV light generation system according to an embodiment of this disclosure. In the first example, in order to detect beam profiles at two distinct positions of a sample beam, the sample beam may first be split by a beam splitter 73, and the split sample beams may be given respectively differing beam path lengths. Then, the beam profiles of these split sample beams may be detected. Here, the sample beam may be a part of the laser beam or the guide laser beam split from the beam path from the laser apparatus 3 to the chamber 2 and entering the detector 57 or 47.

As shown in FIG. 10A, a detector may include a band-pass filter 70, the beam splitter 73, a high-reflection mirror 77, transfer optical systems 75 and 79, and beam profilers 570 and 590.

The band-pass filter 70 may be an optical filter configured to transmit the sample beam to be detected with high transmittance and attenuate or block rays at other wavelengths. The beam splitter 73 may be configured and positioned to transmit a part of the sample beam transmitted through the band-pass filter 70 toward the transfer optical system 75 and reflect the remaining part toward the high-reflection mirror 77. The high-reflection mirror 77 may be positioned to reflect the sample beam reflected by the beam splitter 73 toward the transfer optical system 79 with high reflectance.

The transfer optical system 75 may be positioned to transfer a beam cross-section of the sample beam at a position A1 in a beam path onto a photosensitive surface of the beam profiler 570. The transfer optical system 79 may be positioned to transfer a beam cross-section of the sample beam at a position A2 in a beam path onto a photosensitive surface of the beam profiler 590. Each of the beam profilers 570 and 590 may be configured to output a beam intensity distribution of the sample beam transferred onto the photosensitive surface thereof.

The second controller 58 or the first controller 48 may calculate a position, a direction, and/or a divergence (a curvature of a wavefront) of the laser beam or the guide laser beam based on an output from each of the beam profilers 570 and 590. For example, the centroid of each of the beam intensity distributions detected in the respective beam profilers 570 and 590 may be calculated, and the centroids may serve to indicate the positions of the laser beam and/or the guide laser beam. Further, a direction in which the laser beam or the guide laser beam travels may be calculated from a distance between the positions A1 and A2 and a difference in the positions of the centroids in the respective beam intensity distributions detected in the beam profilers 570 and 590, and this information may serve to indicate the direction in which the laser beam or the guide laser beam travels. Further, the curvature of the wavefront of the laser beam or the guide laser beam may be calculated from a difference in respective beam widths, e.g., full width at half maximum, of the sample beam detected by the beam profilers 570 and 590.

Based on the above-described calculation results, the second controller 58 may control at least one of the laser beam direction control mechanism 41 and the beam steering unit 51. Alternatively, based on the above-described calculation results, the first controller 48 may control the laser beam direction control mechanism 41.

Figure 10B:
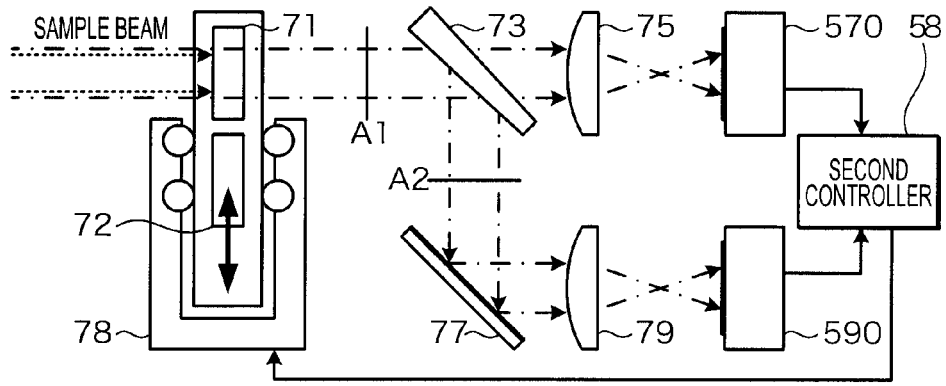
FIG. 10B schematically illustrates an exemplary configuration of a modification of the first example of the detector shown in FIG. 10A.
Figure 10C:
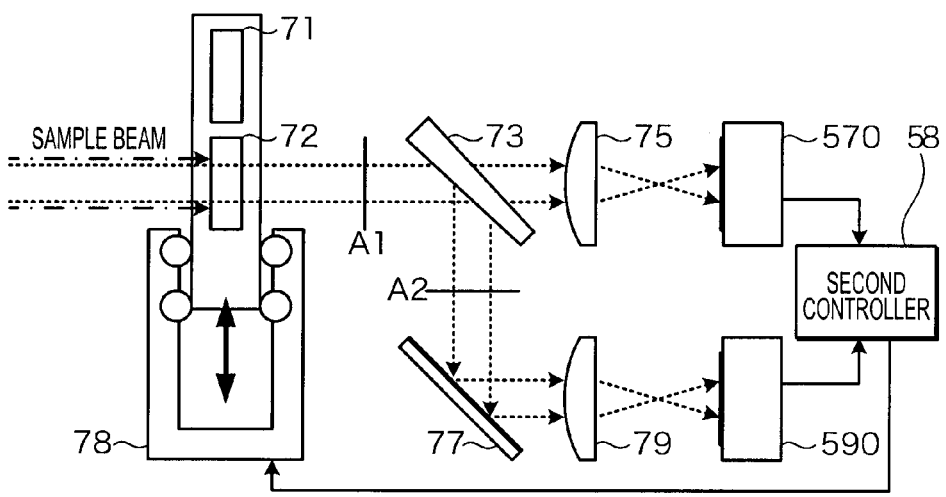
FIG. 10C schematically illustrates an exemplary configuration of the modification of the first example of the detector shown in FIG. 10A.

FIGS. 10B and 10C schematically illustrate exemplary configurations of a modification of the first example of the detector shown in FIG. 10A. The modification of the first example may differ from the first example shown in FIG. 10A in that multiple band-pass filters 71 and 72 may be switched. As shown in FIGS. 10B and 10C, the band-pass filters 71 and 72 may be movable through an actuator unit 78. The actuator unit 78 may be controlled by the second controller 58 or the first controller 48. The band-pass filter 71 may be an optical filter configured to transmit the laser beam from the laser apparatus 3 and attenuate or block rays at other wavelengths. The band-pass filter 72 may be an optical filter configured to transmit the guide laser beam and attenuate or block rays at other wavelengths.

As shown in FIG. 10B, when the actuator unit 78 moves the band-pass filter 71 into a beam path of the sample beam, the laser beam may reach the beam splitter 73. Accordingly, a position, a direction, and/or a curvature of the wavefront of the laser beam may be calculated by the second controller 58 or the first controller 48.

As shown in FIG. 10C, when the actuator unit 78 moves the band-pass filter 72 into a beam path of the sample beam, the guide laser beam may reach the beam splitter 73. Accordingly, a position, a direction, and/or a curvature of the wavefront of the guide laser beam may be calculated by the second controller 58 or the first controller 48.

Here, each of the transfer optical systems 75 and 79 may have a function to compensate chromatic aberration for the wavelengths of the laser beam and the guide laser beam. For example, each of the transfer optical systems 75 and 79 may be an achromat lens or a combination thereof. Further, each of the transfer optical systems 75 and 79 may be configured such that chromatic aberration is small in principle. For example, each of the transfer optical systems 75 and 79 may be a reflective optical element.

According to the modification of the first example, the same beam profilers 570 and 590 may be used to detect the laser beam and the guide laser beam, and thus a deviation between the directions in which the laser beam and the guide laser beam travel may be detected with high precision.

9.2 Detecting Beam Profile and Pointing

Figure 11A:
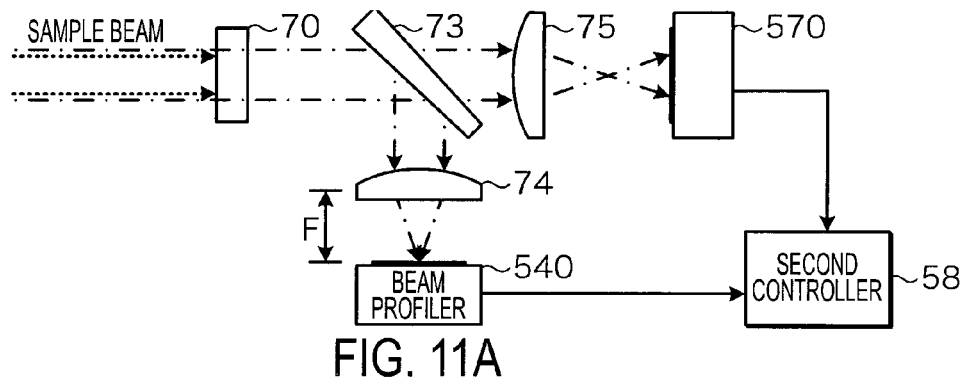
FIG. 11A schematically illustrates an exemplary configuration of a second example of a detector in an EUV light generation system according to an embodiment of this disclosure.

FIG. 11A schematically illustrates an exemplary configuration of a second example of a detector in an EUV light generation system according to an embodiment of this disclosure. In the second example, a sample beam may be split by the beam splitter 73 in order to detect a beam profile of the sample beam at a given position and a beam profile or pointing at the focus of the sample beam.

As shown in FIG. 11A, a detector may include the band-pass filter 70, the beam splitter 73, a focusing optical system 74, the transfer optical system 75, and beam profilers 540 and 570.

The band-pass filter 70 may be an optical filter configured to transmit the sample beam to be detected with high transmittance and attenuate or block rays at other wavelengths. The beam splitter 73 may be configured and positioned to transmit a part of the sample beam transmitted through the band-pass filter 70 toward the transfer optical system 75 and reflect the remaining part toward the focusing optical system 74.

The transfer optical system 75 may be configured to transfer a beam cross-section of the sample beam transmitted through the beam splitter 73 onto a photosensitive surface of the beam profiler 570. The focusing optical system 74 may be configured to image the sample beam reflected by the beam splitter 73 on a photosensitive surface of the beam profiler 540 provided at a position distanced by a focal distance F from the focusing optical system 74. The focal distance F may be a focal distance in the focusing optical system 74. Each of the beam profilers 540 and 570 may be configured to output a beam intensity distribution of the sample beam transferred or imaged on the photosensitive surface thereof.

The second controller 58 or the first controller 48 may be configured to calculate a position, a direction, and/or a divergence or a curvature of the wavefront of the laser beam or the guide laser beam based on an output from each of the beam profilers 540 and 570. For example, the centroid in a beam intensity distribution detected in each of the beam profilers 540 and 570 may be calculated, and the centroid may serve to indicate the position of the laser beam and/or the guide laser beam. Further, the direction in which the laser beam or the guide laser beam travels may be calculated from a difference in the respective centroids in the beam intensity distributions of the laser beam and the guide laser beam detected in the respective beam profilers 540 and 570. Further, the curvature of the wavefront of the laser beam or the guide laser beam may be calculated from a beam width, e.g., full width at half maximum, of the sample beam detected in the beam profiler 570 and a spot size detected in the beam profiler 540.

Based on the above-described calculation results, the second controller 58 may control at least one of the laser beam direction control mechanism 41 and the beam steering unit 51. Alternatively, based on the above-described calculation results, the first controller 48 may control the laser beam direction control mechanism 41.

Figure 11B:
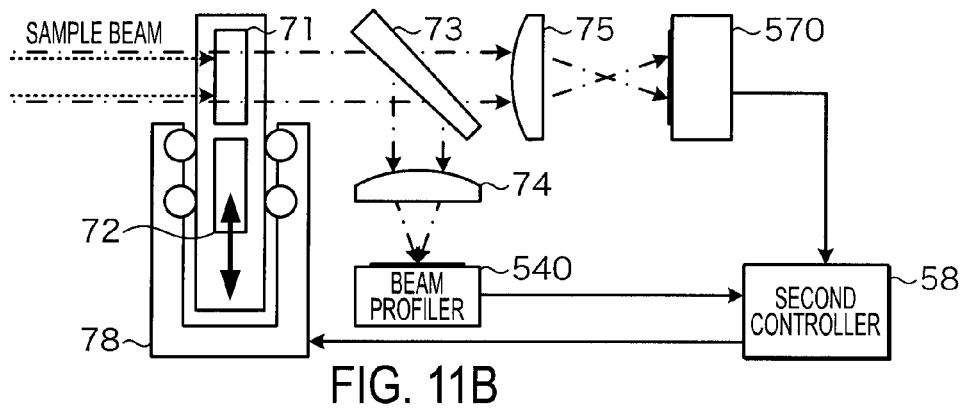
FIG. 11B schematically illustrates an exemplary configuration of a modification of the detector shown in FIG. 11A.

FIG. 11B schematically illustrates an exemplary configuration of a modification of the second example of the detector shown in FIG. 11A. The modification of the second example may differ from the second example shown in FIG. 11A in that the multiple band-pass filters 71 and 72 may be switched. As shown in FIG. 11B, the band-pass filters 71 and 72 may be movable through the actuator unit 78. The actuator unit 78 may be controlled by the second controller 58 or the first controller 48. The band-pass filter 71 may be an optical filter configured to transmit the laser beam from the laser apparatus 3 with high transmittance and attenuate or block rays at other wavelengths. The band-pass filter 72 may be an optical filter configured to transmit the guide laser beam with high transmittance and attenuate or block rays at other wavelengths.

As shown in FIG. 11B, when the actuator unit 78 moves the band-pass filter 71 into a beam path of the sample beam, the laser beam may reach the beam splitter 73. Accordingly, a position, a direction, and/or a curvature of the wavefront of the laser beam may be calculated by the second controller 58 or the first controller 48.

When the actuator unit 78 moves the band-pass filter 72 into a beam path of the sample beam, the guide laser beam may reach the beam splitter 73. Accordingly, a position, a direction, and/or a curvature of the wavefront of the guide laser beam may be calculated by the second controller 58 or the first controller 48.

Here, each of the focusing optical system 74 and the transfer optical system 75 may compensate chromatic aberration for the wavelengths of the laser beam and the guide laser beam. For example, each of the focusing optical system 74 and the transfer optical system 75 may be an achromat lens or a combination thereof. Further, each of the focusing optical system 74 and the transfer optical system 75 may be configured such that chromatic aberration is small in principle. For example, each of the focusing optical system 74 and the transfer optical system 75 may be a reflective optical element.

According to the modification of the second example, the same beam profilers 540 and 570 may be used to detect the laser beam and the guide laser beam, and thus a deviation between the directions in which the laser beam and the guide laser beam travel may be detected with high precision.

9.3 Using Shack-Hartmann Wavefront Sensor

Figure 12A:
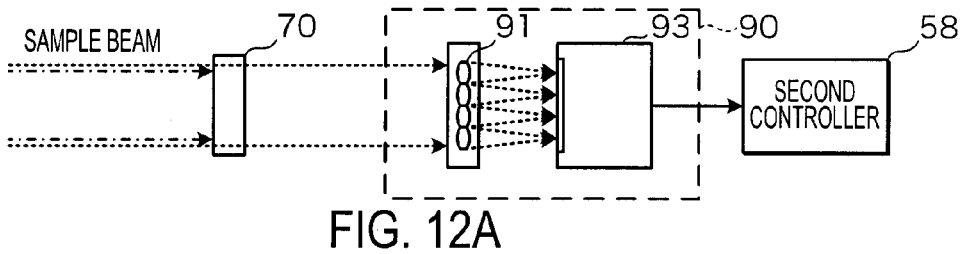
FIG. 12A schematically illustrates an exemplary configuration of a third example of a detector in an EUV light generation system according to an embodiment of this disclosure.

FIG. 12A schematically illustrates an exemplary configuration of a third example of a detector in an EUV light generation system according to an embodiment of this disclosure. In the third example, a Shack-Hartmann wavefront sensor may be used to calculate a direction and a curvature of the wavefront of the laser beam or the guide laser beam.

As shown in FIG. 12A, a detector may include the band-pass filter 70, and a Shack-Hartmann wavefront sensor 90. The Shack-Hartmann wavefront sensor 90 may include a microlens array 91 and a charge coupled device (CCD) camera 93.

The band-pass filter 70 may be an optical filter configured to transmit the sample beam to be detected with high transmittance and attenuate or block rays at other wavelengths. The microlens array 91 may be an optical element in which a plurality of fine convex lenses and concave lenses are arranged two-dimensionally. The CCD camera 93 may be an element for capturing a projected image formed by the microlens array 91.

The second controller 58 or the first controller 48 may calculate a position, a direction, and/or a divergence or a curvature of the wavefront of the laser beam or the guide laser beam based on an output from the CCD camera 93. Then, based on the above-described calculation result, the second controller 58 may control at least one of the laser beam direction control mechanism 41 and the beam steering unit 51. Alternatively, based on the above-described calculation result, the first controller 48 may control the laser beam direction control mechanism 41.

Figure 12B:
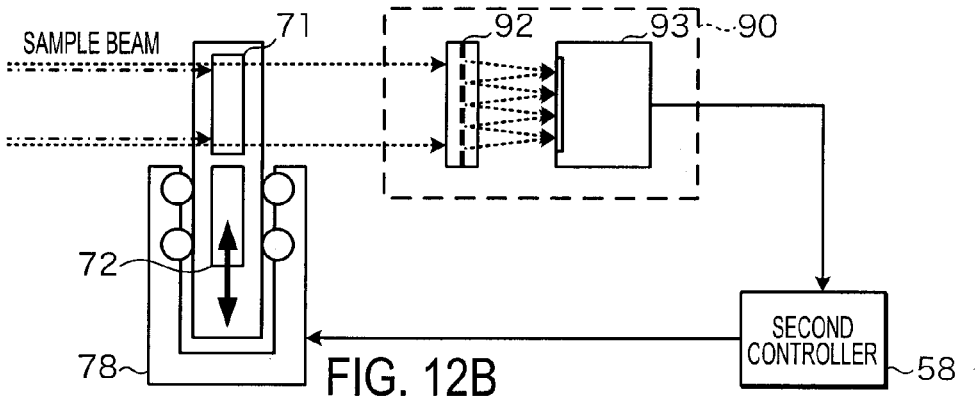
FIG. 12B schematically illustrates an exemplary configuration of a modification of the detector shown in FIG. 12A.

FIG. 12B schematically illustrates an exemplary configuration of a modification of the third example of the detector shown in FIG. 12A. The modification of the third example may differ from the third example shown in FIG. 12A in that the multiple band-pass filters 71 and 72 may be switched. As shown in FIG. 12B, the band-pass filters 71 and 72 may be movable through the actuator unit 78. The actuator unit 78 may be controlled by the second controller 58 or the first controller 48. In the Shack-Hartmann wavefront sensor 90, a screen 92 having multiple pinholes may be used in place of the microlens array 91. The band-pass filter 71 may be an optical filter configured to transmit the laser beam from the laser apparatus 3 with high transmittance and attenuate or block rays at other wavelengths. The band-pass filter 72 may be an optical filter configured to transmit the guide laser beam with high transmittance and attenuate or block rays at other wavelengths.

As shown in FIG. 12B, when the actuator unit 78 moves the band-pass filter 71 into a beam path of the sample beam, the laser beam may reach the Shack-Hartmann wavefront sensor 90. Accordingly, a position, a direction, and/or a curvature of the wavefront of the laser beam may be calculated by the second controller 58 or the first controller 48.

When the actuator unit 78 moves the band-pass filter 72 into a beam path of the sample beam, the guide laser beam may reach the Shack-Hartmann wavefront sensor 90. Accordingly, a position, a direction, and/or a curvature of the wavefront of the guide laser beam may be calculated by the second controller 58 or the first controller 48.

According to the modification of the third example, a single Shack-Hartmann wavefront sensor 90 is used to detect the laser beam and the guide laser beam, and thus a deviation between the directions in which the laser beam and the guide laser beam travel may be detected with high precision.

9.4 Using Optical Position Detector

Figure 13:
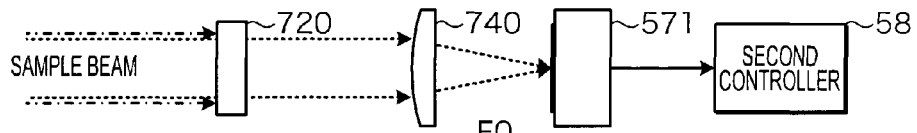
FIG. 13 schematically illustrates an exemplary configuration of a fourth example of a detector in an EUV light generation system according to an embodiment of this disclosure.

FIG. 13 schematically illustrates an exemplary configuration of a fourth example of a detector in an EUV light generation system according to an embodiment of this disclosure. In the fourth example, a fast-response optical position detector, such as a PSD, may be used to detect a position of the guide laser beam.

As shown in FIG. 13, a detector may include a band-pass filter 720, a focusing optical system 740, and an optical position detector 571. The band-pass filter 720 may be an optical filter configured to transmit the guide laser beam and attenuate or block rays at other wavelengths. The focusing optical system 740 may be positioned to focus the guide laser beam transmitted through the band-pass filter 720 on a photosensitive surface of the optical position detector 571 provided at a position distanced by a focal distance F0 from the focusing optical system 740. The focal distance F0 may be a focal distance in the focusing optical system 740. The optical position detector 571 may output a position of the centroid of the guide laser beam focused on the photosensitive surface thereof.

Based on an output of the optical position detector 571, the second controller 58 may control the beam steering unit 51. Since the optical position detector 571 outputs the centroid position instead of the beam intensity distribution, the processing may be carried out at high speed. Accordingly, vibration in the beam steering unit 51 may be accommodated, and a change in directions in which the laser beam and the guide laser beam travel may be suppressed. Here, a four-divided sensor may be used in place of the optical position detector 571.

9.5 Combination of First through Fourth Examples

Figure 14:
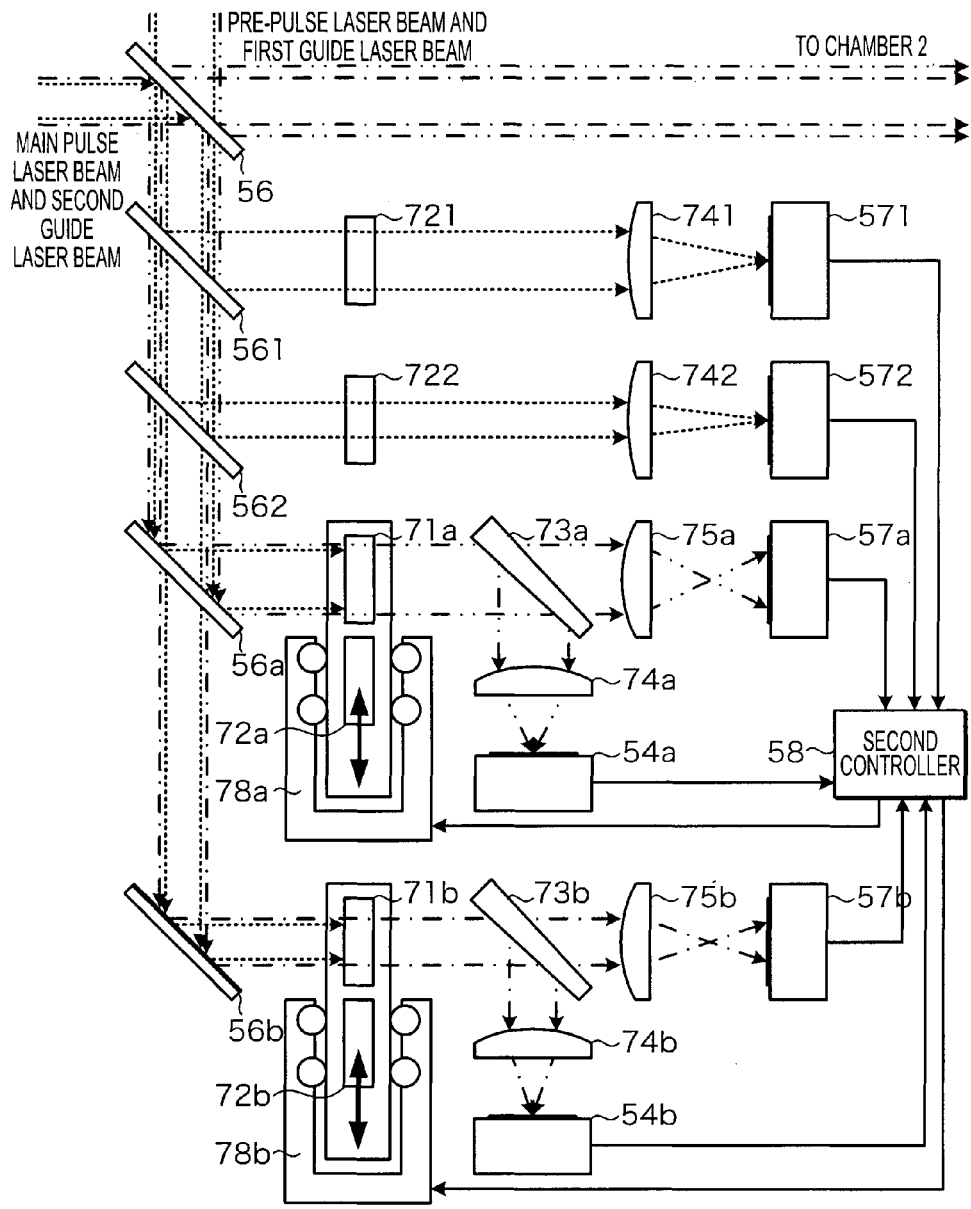
FIG. 14 schematically illustrates an exemplary configuration of a fifth example of a detector in an EUV light generation system according to an embodiment of this disclosure.

FIG. 14 schematically illustrates an exemplary configuration of a fifth example of a detector in an EUV light generation system according to an embodiment of this disclosure. In the fifth example, the above-described first through fourth examples may be combined.

As described in the third embodiment (see FIG. 6), the pre-pulse laser beam and the first guide laser beam may be incident on the first surface of the beam splitter 56, and the main pulse laser beam and the second guide laser beam may be incident on the second surface of the beam splitter 56. At least the pre-pulse laser beam and the main pulse laser beam may be outputted from the first surface of the beam splitter 56 and guided into the chamber 2. A part of the pre-pulse laser beam, the first guide laser beam, a part of the main pulse laser beam, and the second guide laser beam may be outputted from the second surface of the beam splitter 56 collectively as a sample beam.

Beam splitters 561, 562, and 56a and a high-reflection mirror 56b may be provided in this order in a beam path of the sample beam. The beam splitter 561 may be configured to reflect a part of the first guide laser beam and transmit the remaining part of the sample beam. The beam splitter 562 may be configured to reflect a part of the second guide laser beam and transmit the remaining part of the sample beam. The beam splitter 56a may be configured to reflect the pre-pulse laser beam and the first guide laser beam with high reflectance and transmit the main pulse laser beam and the second guide laser beam with high transmittance. The high-reflection mirror 56b may be configured to reflect the main pulse laser beam and the second guide laser beam with high reflectance.

A detector configured similarly to the fourth example of the detector, which includes a band-pass filter 721, a focusing optical system 741, and the optical position detector 571, may be provided in a beam path of the first guide laser beam reflected by the beam splitter 561. With this arrangement, the second controller 58 may detect a position of the first guide laser beam and control the beam steering unit 51a at high speed.

A detector configured similarly to the fourth example of the detector, which includes a band-pass filter 722, a focusing optical system 742, and an optical position detector 572, may be provided in a beam path of the second guide laser beam reflected by the beam splitter 562. With this arrangement, the second controller 58 may detect a position of the second guide laser beam and control the beam steering unit 51b at high speed.

A detector configured similarly to the modification of the second example of the detector may be provided in a beam path of the pre-pulse laser beam and the first guide laser beam reflected by the beam splitter 56a. With this arrangement, the second controller 58 may calculate positions, directions, and/or curvatures of the wavefront of the pre-pulse laser beam and the first guide laser beam and control the beam steering unit 51a or the laser beam direction control mechanism 41a. In place of the detector similar to the modification of the second example of the detector, a detector configured similarly to the first or third example of the detector may be used.

A detector configured similarly to the modification of the second example of the detector may be provided in a beam path of the main pulse laser beam and the second guide laser beam reflected by the high-reflection mirror 56b. With this arrangement, the second controller 58 may calculate positions, directions, and/or curvatures of the wavefront of the main pulse laser beam and the second guide laser beam and control the beam steering unit 51b or the laser beam direction control mechanism 41b. In place of the detector similar to the modification of the second example of the detector, a detector configured similarly to the first or third example of the detector may be used.

10. Supplementary Descriptions 10.1 Adjusting Mechanism

Figure 15:
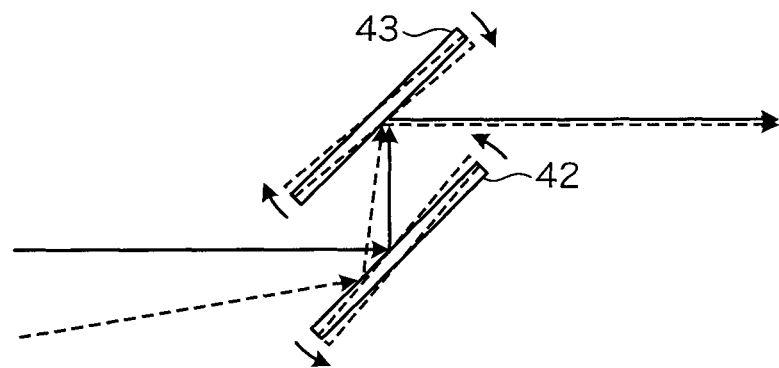
FIG. 15 is a diagram for discussing an exemplary operation of a laser beam direction control mechanism.

FIG. 15 is a diagram for discussing an exemplary operation of a laser beam direction control mechanism. By controlling posture angles ($\theta x$, $\theta y$) of each of the high-reflection mirrors 42 and 43, a direction in which an entering laser beam travels may be controlled to a desired direction. The direction of the angle $\theta x$ may be perpendicular to the direction of the angle $\theta y$. For example, the mirror holders 421 and 431 (see FIG. 2) on which the respective high-reflection mirrors 42 and 43 are attached may have an adjusting function through a gimbal mechanism. The gimbal mechanism is a type of rotating platform for rotating an object about two axes that are orthogonal to each other.

10.2 Actuator Unit

Figure 16:
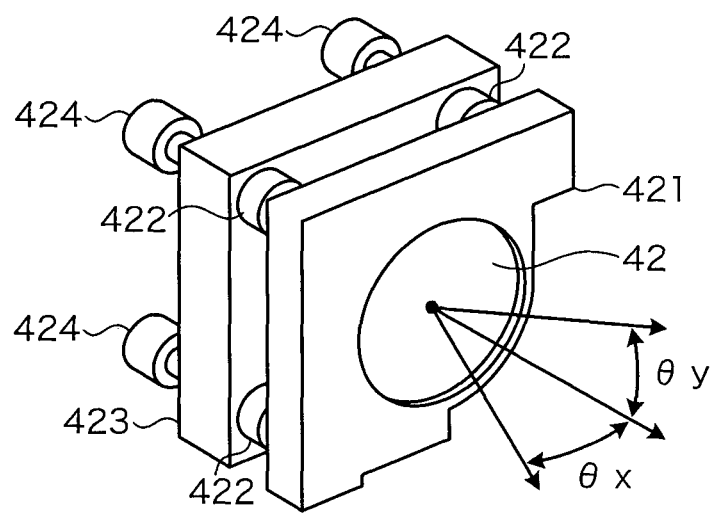
FIG. 16 shows a specific example of an actuator unit in a laser beam direction control mechanism.

FIG. 16 shows a specific example of an actuator unit in a laser beam direction control mechanism. The high-reflection mirror 42 may be held by the mirror holder 421, and the mirror holder 421 may be attached displaceably to a base part 423 through a connection part 422. For example, the connection part 422 may be formed of a spring and a guide. The spring may cause a force to act on the mirror holder 421 and the base part 423 such that the mirror holder 421 and the base part 423 are attracted to each other. The guide may define a displacement direction such that the mirror holder 421 may be displaced in a predetermined direction with respect to the base part 423. A first end of each of the three connection parts 422 in which a piezoelectric element is used may be fixed to the base part 423. A second end of each of the three connection parts 422 may be in contact with the mirror holder 421. Each of the three connection parts 422 may include a feeding mechanism which varies a distance between the base part 423 and the mirror holder 421 independently for each connection part 422 in accordance with a drive signal from a driver controlled by the first controller 48. The base part 423 may be fixed to a housing of the laser beam direction control mechanism.

In this way, by varying a distance between the base part 423 and the mirror holder 421 independently at three points, the posture of the high-reflection mirror 42 may be adjusted in the $\theta x$ direction and the $\theta y$ direction. The actuator unit for adjusting the posture of each of the high-reflection mirrors 43, 52, and 53 may be configured similarly.

The above-described embodiments and the modifications thereof are merely examples for implementing this disclosure, and this disclosure is not limited thereto. Making various modifications according to the specifications or the like is within the scope of this disclosure, and other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. An alignment system for use with a laser apparatus, comprising:
   a guide laser device configured to output a guide laser beam;
   an adjusting mechanism configured to adjust a travel direction of at least one of the guide laser beam and a laser beam from the laser apparatus;
   a beam path combiner configured to control a travel direction of the laser beam and a travel direction of the guide laser beam to substantially coincide with each other;
   a first optical detection unit provided downstream from the beam path combiner and configured to detect the laser beam and the guide laser beam;
   a first controller configured to control the adjusting mechanism based on a detection result of the first optical detection unit;
   a beam steering unit provided downstream from the beam path combiner and configured to control travel directions of the laser beam and the guide laser beam;
   a second optical detection unit provided downstream from the beam steering unit and configured to detect at least the guide laser beam; and
   a second controller configured to control the beam steering unit based on a detection result of the second optical detection unit, wherein
   the beam steering unit includes:
   a hollow optical pipe provided downstream from the beam path combiner and upstream from the second optical detection unit;
   a first optical element provided inside the hollow optical pipe and configured to control travel directions of the laser beam and the guide laser beam;
   a second optical element provided inside the hollow optical pipe and configured to control travel directions of the laser beam and the guide laser beam;
   a first actuator unit configured to adjust the position and posture of the first optical element; and
   a second actuator unit configured to adjust the position and posture of the second optical element.

2. The alignment system according to claim 1, further comprising:
   a beam path adjuster provided downstream from the beam steering unit and configured to control travel directions of the laser beam and the guide laser beam;
   a third optical detection unit provided downstream from the beam path adjuster and configured to detect a position of at least the guide laser beam; and
   a third controller configured to control the beam path adjuster based on a detection result of the third optical detection unit.

3. The alignment system according to claim 1, further comprising
   an amplifier provided downstream from the beam path combiner and configured to amplify the laser beam.

4. An extreme ultraviolet light generation system, comprising:
   the alignment system of claim 1;
   a chamber having an inlet through which a laser beam is introduced into the chamber;
   a target supply unit provided in the chamber and configured to supply a target material to a predetermined region inside the chamber; and
   a laser beam focusing optical system configured to focus the laser beam in the predetermined region inside the chamber.

5. An alignment system for use with a laser apparatus, comprising:
   a guide laser device configured to output a guide laser beam;
   an adjusting mechanism configured to adjust a travel direction of at least one of the guide laser beam and a laser beam from the laser apparatus;
   a beam path combiner configured to control a travel direction of the laser beam and a travel direction of the guide laser beam to substantially coincide with each other;
   a beam steering unit provided downstream from the beam path combiner and configured to control travel directions of the laser beam and the guide laser beam;
   an optical detection unit provided downstream from the beam steering unit and configured to detect the laser beam and the guide laser beam; and
   a controller configured to control the adjusting mechanism and the beam steering unit based on a detection result of the optical detection unit, wherein
   the beam steering unit includes:
   a hollow optical pipe provided downstream from the beam path combiner and upstream from the optical detection unit;
   a first optical element provided inside the hollow optical pipe and configured to control travel directions of the laser beam and the guide laser beam;
   a second optical element provided inside the hollow optical pipe and configured to control travel directions of the laser beam and the guide laser beam;
   a first actuator unit configured to adjust the position and posture of the first optical element; and
   a second actuator unit configured to adjust the position and posture of the second optical element.

6. The alignment system according to claim 5, further comprising an amplifier provided downstream from the beam path combiner and configured to amplify the laser beam.

7. An extreme ultraviolet light generation system, comprising:
   the alignment system of claim 5;
   a chamber having an inlet through which a laser beam is introduced into the chamber;
   a target supply unit provided in the chamber and configured to supply a target material to a predetermined region inside the chamber; and
   a laser beam focusing optical system configured to focus the laser beam in the predetermined region inside the chamber.

* * * * *